United States Patent
Garg et al.

(10) Patent No.: US 11,256,367 B2
(45) Date of Patent: Feb. 22, 2022

(54) TECHNIQUES FOR HANDLING UNINTENTIONAL TOUCH INPUTS ON A TOUCH-SENSITIVE SURFACE

(71) Applicant: Apple Inc., Cupertino, CA (US)

(72) Inventors: Mayank Garg, Santa Clara, CA (US); Apexit Shah, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/866,473

(22) Filed: May 4, 2020

(65) Prior Publication Data

US 2021/0096725 A1    Apr. 1, 2021

Related U.S. Application Data

(60) Provisional application No. 62/907,259, filed on Sep. 27, 2019.

(51) Int. Cl.
*G06F 3/041* (2006.01)

(52) U.S. Cl.
CPC ........ *G06F 3/04186* (2019.05); *G06F 3/0412* (2013.01); *G06F 2203/04104* (2013.01)

(58) Field of Classification Search
None
See application file for complete search history.

(56) References Cited

U.S. PATENT DOCUMENTS

| | | | |
|---|---|---|---|
| 8,963,859 B2 | 2/2015 | Wang | |
| 10,222,900 B2 | 3/2019 | Jeong et al. | |
| 2008/0158145 A1 | 7/2008 | Westerman | |
| 2012/0242617 A1 | 9/2012 | Lee | |
| 2013/0141383 A1 | 6/2013 | Woolley | |
| 2013/0207913 A1* | 8/2013 | Takashima | G06F 3/04883 345/173 |
| 2014/0071084 A1 | 3/2014 | Sugiura | |
| 2014/0104194 A1 | 4/2014 | Davidson et al. | |
| 2014/0104225 A1 | 4/2014 | Davidson et al. | |
| 2014/0247245 A1 | 9/2014 | Lee | |
| 2014/0368436 A1 | 12/2014 | Abzarian et al. | |
| 2015/0242028 A1 | 8/2015 | Roberts et al. | |
| 2015/0370387 A1 | 12/2015 | Yamaguchi et al. | |
| 2016/0062533 A1 | 3/2016 | O'Connor | |

(Continued)

OTHER PUBLICATIONS

Final Office Action received for U.S. Appl. No. 14/558,529, dated Sep. 29, 2016, 23 pages.

(Continued)

*Primary Examiner* — Aneeta Yodichkas
(74) *Attorney, Agent, or Firm* — Kubota & Basol LLP

(57) ABSTRACT

Grip detection can be beneficial for an electronic device to ignore unintended contacts on a touch sensitive surface. Examples of the disclosure provide various ways for identifying an input patch as a grip. In some examples, identifying an input patch as a grip comprises determining whether the input patch satisfies one or more grip identification criteria. In some examples, identified grips are saved in a grip database. In some examples, the identified grips are filtered out of touch images. In some examples, when baseline touch data for a touch-sensitive is updated, the touch processor can forgo updating the baseline for portions of the touch sensitive surface associated with the identified grips.

17 Claims, 12 Drawing Sheets

(56) References Cited

U.S. PATENT DOCUMENTS

2016/0253039 A1* 9/2016 Heo .................... G06F 3/0412
                                                         345/173
2019/0114021 A1    4/2019 Oliver et al.

OTHER PUBLICATIONS

Non-Final Office Action received for U.S. Appl. No. 14/558,529, dated Apr. 14, 2016, 21 pages.
Non-Final Office Action received for U.S. Appl. No. 14/558,529, dated Jun. 26, 2017, 6 pages.
Notice of Allowance received for U.S. Appl. No. 14/558,529, dated Oct. 13, 2017, 8 pages.

* cited by examiner

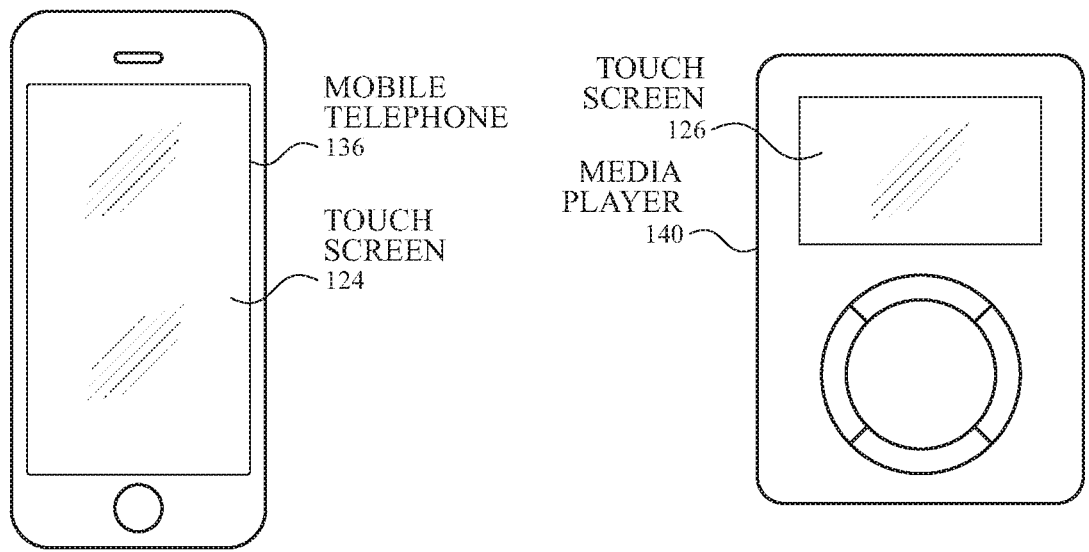
FIG. 1A
FIG. 1B
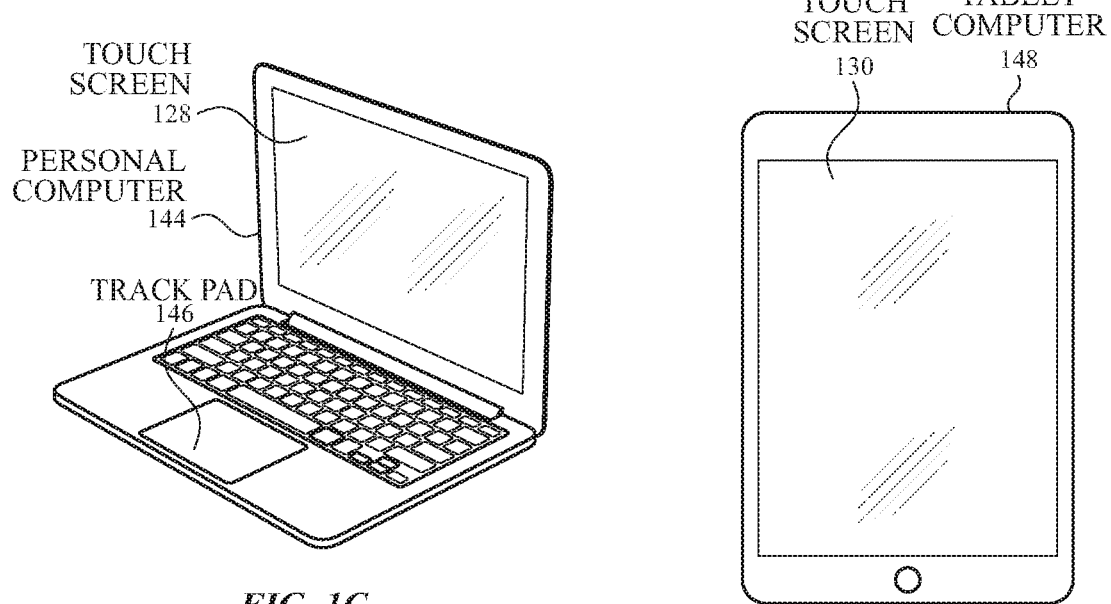
FIG. 1C
FIG. 1D

TECHNIQUES FOR HANDLING UNINTENTIONAL TOUCH INPUTS ON A TOUCH-SENSITIVE SURFACE

CROSS REFERENCE TO RELATED APPLICATIONS

This application claims the benefit of U.S. Provisional Patent Application No. 62/907,259, filed Sep. 27, 2019, the contents of which are hereby incorporated by reference in their entireties for all purposes.

FIELD OF THE DISCLOSURE

This relates generally to touch input processing for touch-sensitive devices, and more particularly, to processing a grip detected on a touch-sensitive surface.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of transparent, semi-transparent or non-transparent conductive plates made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). In some implementations, due in part to their substantial transparency, some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

SUMMARY OF THE DISCLOSURE

This relates to systems and methods for detecting touch inputs on a touch-sensitive surface and processing the touch input based on whether the touch input is determined to be a user gripping or otherwise holding the device such that the touch input is not an intentional touch input. Identifying touch inputs as unintentional touches can be beneficial to avoid triggering unintended functions. For example, a user that is walking with the device can be holding or gripping the device such that the user's hand covers some or all of the touch-sensitive surface. Similarly, a user can hold the device with one hand which can be partially contacting the touch-sensitive surface of the device while intentionally interacting with the touch-sensitive surface with a finger of another hand. Examples of the disclosure provide ways in which the electronic device determines whether a touch input is an unintentional input based on the characteristics of the touch input and processes the touch input based on the determination.

BRIEF DESCRIPTION OF THE DRAWINGS

FIGS. 1A-1D illustrate exemplary systems with touch sensitive surfaces that can perform input processing according to examples of the disclosure.

DETAILED DESCRIPTION

Figure 2:
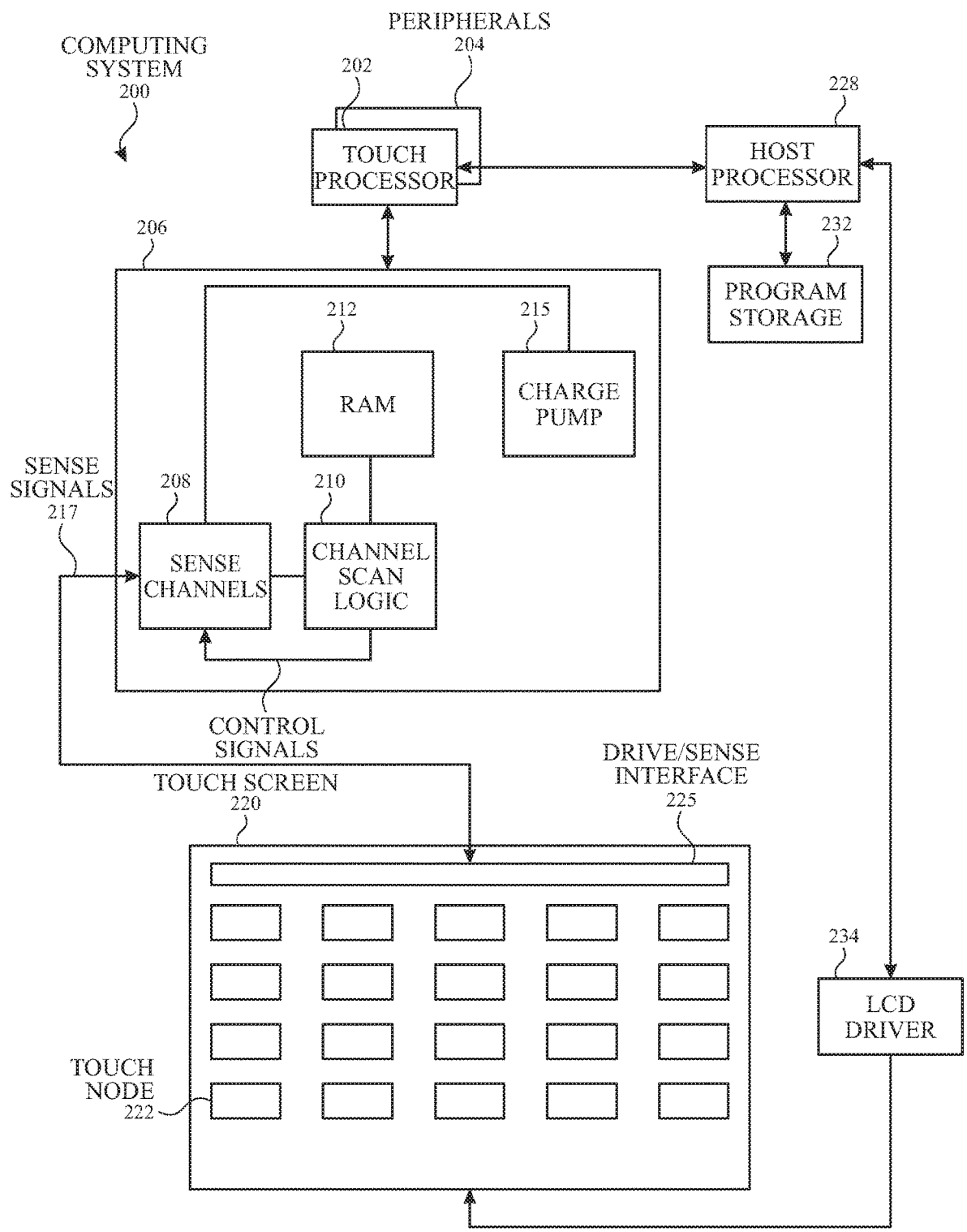
FIG. 2 is a block diagram of an example computing system that illustrates one implementation of an example touch screen according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to systems and methods for detecting touch inputs on a touch-sensitive surface and processing the touch input based on whether the touch input is determined to be a user gripping or otherwise holding the device such that the touch input is not an intentional touch input. Identifying touch inputs as unintentional touches can be beneficial to avoid triggering unintended functions. For example, a user that is walking with the device can be holding or gripping the device such that the user's hand covers some or all of the touch-sensitive surface. Similarly, a user can hold the device with one hand which can be partially contacting the touch-sensitive surface of the device while intentionally interacting with the touch-sensitive surface with another hand. Examples of the disclosure provide ways in which the electronic device determines whether a touch input is an unintentional input based on the characteristics of the touch input and processes the touch input based on the determination.

FIGS. 1A-1D illustrate exemplary systems with touch sensitive surfaces that can perform input processing according to examples of the disclosure. As described in more detail herein, the input processing can include a grip detection algorithm. FIG. 1A illustrates an exemplary mobile telephone 136 that includes a touch screen 124 and can perform input processing according to examples of the disclosure. FIG. 1B illustrates an example digital media player 140 that includes a touch screen 126 and can perform input processing according to examples of the disclosure. FIG. 1C illustrates an example personal computer 144 that includes a touch screen 128 and a track pad 146 and can perform input processing according to examples of the disclosure (on inputs detected from the touchscreen 128 or track pad 146). FIG. 1D illustrates an example tablet computing device 148 that includes a touch screen 130 and can perform input processing according to examples of the disclosure. It should be understood that the example devices illustrated in FIGS. 1A-1D are provided by way of example, and other types of devices can perform input processing according to examples of the disclosure. Additionally, although the devices illustrated in FIGS. 1A-1D include touch screens, in some examples, input processing according to examples of the disclosure can be performed for touch sensor panels without a display (e.g., track pad 146) or any other type of touch sensitive surface. In some examples, touch screens 124, 126, 128, and 130 can be based on self-capacitance and/or mutual capacitance touch detection technology. In some examples, a touch screen can be multi-touch, single touch, projection scan, full-imaging multi-touch, capacitive touch, etc.

FIG. 2 is a block diagram of an example computing system 200 that illustrates one implementation of an example touch screen 220 according to examples of the disclosure. It is understood that computing system 200 can include a self-capacitance touch screen or a mutual capacitance touch screen, as described above. Computing system 200 can be included in, for example, mobile telephone 136, digital media player 140, personal computer 144, tablet computing device 148 or any mobile or non-mobile computing device that includes a touch screen or touch sensitive surface. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In some examples, RAM 212 can contain various configuration information for specific touch screen 220 scans performed by channel scan logic 210 (e.g., scan specific configuration information for sense channels 208), can receive and/or store touch data from sense channels 208, and can be managed by channel scan logic 210. In addition, channel scan logic 210 can control sense channels 208 to generate stimulation signals at various frequencies and phases that can be selectively applied to the touch nodes of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can include touch sensing circuitry that can include a capacitive sensing medium having a plurality of electrically isolated touch node electrodes 222 (e.g., a pixelated self-capacitance touch screen). Touch node electrodes 222 can be coupled to sense channels 208 in touch controller 206, can be driven by stimulation signals from the sense channels through drive/sense interface 225, and can be sensed by the sense channels through the drive/sense interface as well, as described above. As used herein, an electrical component "coupled to" or "connected to" another electrical component encompasses a direct or indirect connection providing electrical path for communication or operation between the coupled components. Thus, for example, touch node electrodes 222 may be directly connected to sense channels or indirectly connected to sense channels via drive/sense interface 225, but in either case provided an electrical path for driving and/or sensing the touch node electrodes 222. In some examples, drive/sense interface 225 can be implemented in the touch controller 206, or can be implemented in a chip separate from touch controller 206. Additional exemplary details of how drive/sense interface 225 can be implemented can be found in U.S. patent application Ser. No. 15/009,774, filed Jan. 28, 2016, entitled "Flexible Self Capacitance and Mutual Capacitance Touch Sensing System Architecture," the entire contents of which is hereby incorporated by reference for all purposes. Labeling the conductive plates used to detect touch (i.e., touch node electrodes 222) as "touch node" electrodes can be particularly useful when touch screen 220 is viewed as capturing an "image" of touch (e.g., a "touch image"). In other words, after touch controller 206 has determined an amount of touch detected at each touch node electrode 222 in touch screen 220, the pattern of touch node electrodes in the touch screen at which a touch occurred can be thought of as a touch image (e.g., a pattern of fingers touching the touch screen).

It is understood that touch screen 220 described herein can correspond to touch screen 124, 126, 128, 130 and/or track pad 146. For example, tablet computing device 148 can include computing system 200 for controlling touch screen 130. In such examples, touch screen 220 can receive sense signals and/or provide sensor signals to/from touch controller 206. In some examples, display driver 234 can drive displays on touch screen 130.

Computing system 200 can also include a host processor 228 for receiving outputs from touch processor 202 and performing actions based on the outputs. For example, host processor 228 can be connected to program storage 232 and a display controller, such as a display driver 234 (e.g., for controlling operation of a display, such as an LCD display, an OLED display, etc.). The display driver 234 can provide voltages on select (e.g., gate) lines to each pixel transistor and can provide data signals along data lines to these same transistors to control the pixel display image as described in more detail below. Host processor 228 can use display driver 234 to generate a display image on touch screen 220, such as a display image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3:
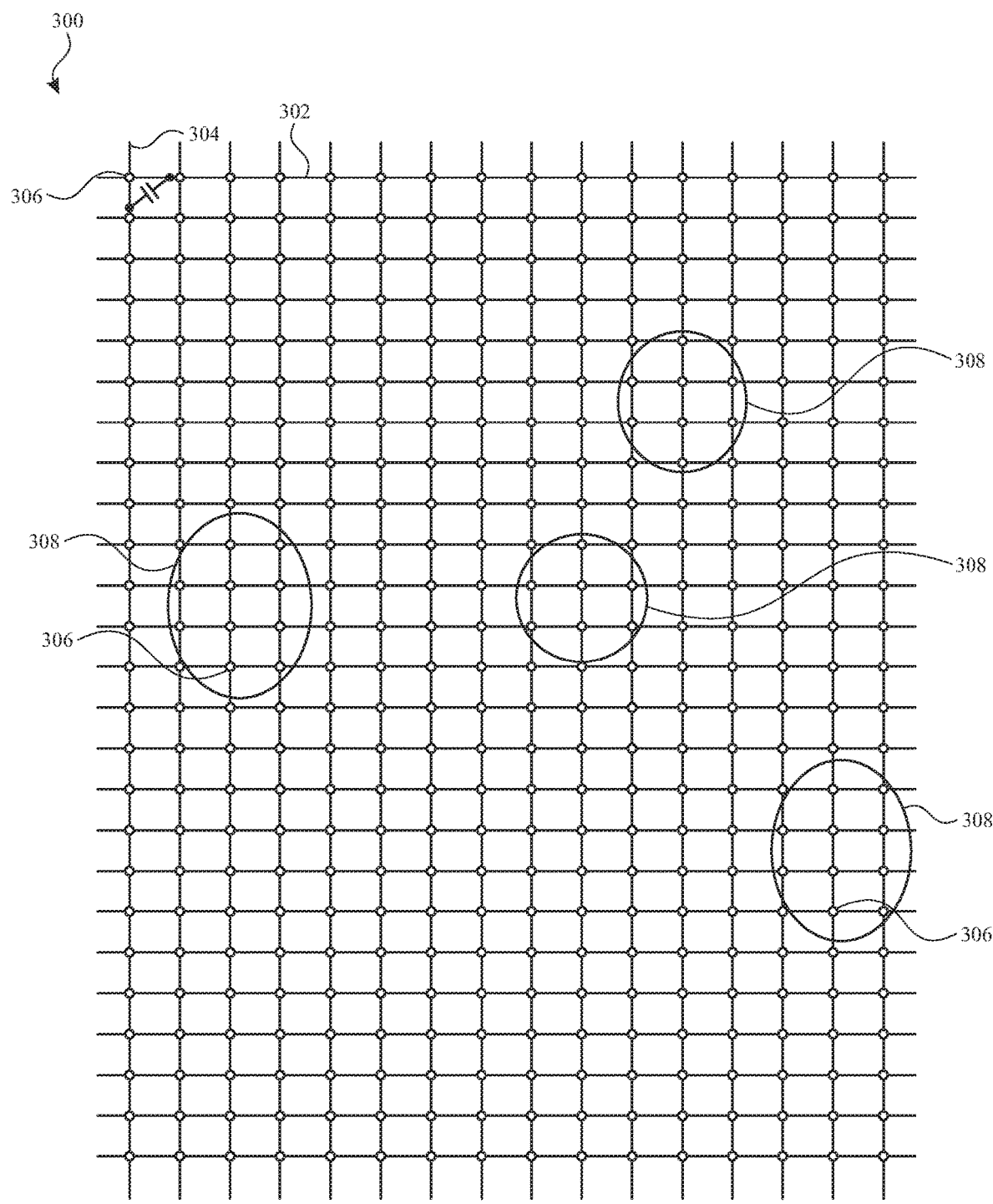
FIG. 3 illustrates an exemplary representation of an image of touch according to examples of the disclosure.

As described above, capacitive measurements (touch signals or data) at the touch nodes of touch sensor panel 224 can be viewed as an image of the touch (or touch image) when processed by touch processor 202 and/or host processor 228. FIG. 3 illustrates an exemplary representation of an image of touch according to examples of the disclosure. Touch screen 300 can include drive lines 302 and sense lines 304 arranged as a pattern of rows and columns, although other patterns can be possible. Touch nodes 306 can be formed at the intersection between drive lines 302 and sense lines 304, and the mutual capacitance (or change in mutual capacitance) therebetween can be measured. Each object touching or proximate to, but not touching, the touch screen 300 can produce a touch signal at proximate touch nodes 306. In some examples, the touch image can be represented as a grid of numbers (e.g., a two dimensional matrix), with each number representing the touch signal or intensity of the touch signal at a respective touch node (e.g., positive or negative numbers representing the capacitance that is detected at the respective touch node). By processing the touch image, touch signals from proximate touch nodes 306 (e.g., those touch signals meeting (greater than or equal to) a threshold signal level) can be grouped together to form input patches 308 in a multi-touch image segmentation process. Thus, the input patches 308 can be regions within the image of touch corresponding to touch nodes 306 having signal values produced by an object touching (or proximate to, but not touching, in some examples) the touch screen 300. Although FIG. 3 illustrates a row-column mutual capacitance representation of touch nodes and a touch image formed from touch signal measurements at these touch nodes, a touch image can also be formed from touch signal measurements at touch nodes corresponding to electrodes measuring self-capacitance in a pixelated touch sensor panel. The touch image processing described herein can be performed for generated touch images irrespective of the type of touch sensor panel (e.g., for row-column or pixelated touch sensor panels). The input patches identified in a touch image can be tracked through multiple successive touch images. Input patches from a corresponding object captured across multiple touch images can be assigned to a corresponding path. Assigning input patches to paths can allow for tracking gesture inputs (e.g., swipe, pinch, etc.). In some examples, the path can track the input contact from an initial touchdown on the touch-sensitive surface through a liftoff from the touch-sensitive surface. In some examples, the input patches of a path can be analyzed to identify movement of the input patch across one or more touch images and thereby track movement of an object corresponding to the input patches. Although a path can be used to identify movement, some paths may not include movement (e.g., when the input patch remains in the same position from touchdown to liftoff, such as in a tap). The tracking can include tracking position, velocities, and/or geometries (e.g., shape, number of touch nodes) of the input patches from various touch images corresponding to a path.

Various characteristics can be computed for each input patch in the touch image that can be used for further processing. For example, each input patch can be characterized by total signal, peak signal (or maximum signal), minimum signal, position, shape, size and/or orientation. In some examples, each input patch can be represented by an ellipse defined by a centroid (location of touch), major and minor axis lengths and/or a major axis (and/or minor axis) orientation (or alternatively an x-axis radius and a y-axis radius). In some examples, the number of touch nodes, peak signal, total signal and/or signal density for each input patch can be computed. In some examples, the number of touch nodes, peak signal and/or peak signal density can be tracked for each path across multiple touch images.

For example, the number of touch nodes in a path can be calculated by counting the number of touch nodes with the threshold signal level included in the input patch. The peak signal can, for example, be calculated by taking the maximum signal measured at the touch nodes included in the input patch. An input patch's total signal can, for example, be calculated by summing the square of the signal value at each touch node in the input patch. Thus, total signal for an input patch can be expressed mathematically as in Equation (1):

$$Z_P = \sum_{i,j \text{ in } P} [V^2_{[i][j]}] \quad (1)$$

where $Z_P$ can represent the total signal for an input patch, V can represent the signal value at a touch node and i, j can represent the row and column coordinate of each touch node. In some examples, the input patch's total signal can be calculated by summing the signal value at each touch node in the input patch (e.g., without squaring the signal). In some examples, the input patch's total signal can be calculated by summing the signal value at each touch node in the input patch and squaring the sum (e.g., squared after the sum). In some examples, other arithmetic or geometric sums are possible. In some examples, the signal value at each touch node can be calibrated (e.g., normalized) before computing the total signal.

An input patch's signal density can be computed based on the input patch's total signal. In some examples, an input patch's signal density can be calculated by dividing the total signal for an input patch by the geometric mean radius of the input patch. In other examples, the input patch's signal density can be calculated by dividing the total signal for an input patch by the number of touch nodes in the input patch. Thus, signal density for an input patch can be expressed mathematically, for example, as in Equations (2) or (3):

$$Z_{density,P} = \frac{Z_P}{\text{geometric mean radius of } P} \quad (2)$$

$$Z_{density,P} = \frac{Z_P}{\text{number of touch nodes forming } P} \quad (3)$$

A multi-touch sensing system may use a segmentation process to discriminate between different input patches and compute characteristics for all input patches identified in an acquired image. Additionally, such a multi-touch sensing system may process patches corresponding to intentional, actual touches as well as input patches corresponding to unintended touches. In some examples, in a low-power state, a simplified touch detection algorithm can be performed without requiring the significant processing resources for touch image segmentation and parameterization of multiple touches. For example, during a low-power state, a touch processor can look for specific input patterns (e.g., a tap at a predetermined area of the touch sensitive surface, a particular swipe pattern, etc.) for waking the device from the sleep state to an awake state (e.g., such as at 516 describe below with respect to FIG. 5) and optionally ignore (e.g., determine whether the input is a grip or otherwise not process) inputs that do not match the specific input patterns.

While the examples of the disclosure are generally described herein as occurring during a low-power state (e.g., a sleep state) or an active state (e.g., an awake state), in some examples, the electronic device can have more than two states of operation, including multiple low-power states. For example, the electronic device can have a plurality of states corresponding to and defining a different manner of operation for the electronic device. For example, in the active state, a display of the electronic device (e.g., the display component of the touch screen of the electronic device) can be active (e.g., displaying one or more images), and processing circuitry associated with sensing touch on the touch screen of the electronic device can be operating at a given state of readiness (e.g., touch controller 206 and/or touch processor 202 can be powered on at full power operation). In various states of the electronic device, some of the processing circuitry associated with sensing touch on the touch screen of the electronic device can be disabled or in a reduced-activity/reduced-power state (e.g., touch controller 206 and/or touch processor 202 can be disabled or continue operation to various degrees in reduced-power operation), though the display of the electronic device (e.g., the display component of the touch screen of the electronic device) may or may not remain active.

In some examples, while performing touch processing, a touch processor can identify one or more grip events. Grip events can correspond to a user gripping or otherwise holding the electronic device in such a way as to make inadvertent contact with the touch-sensitive surface (e.g., not intended input for interacting with the touch screen). In some examples, the grip event can involve one or more fingers, a thumb, and/or some or all of a user's palm. In some examples, the grip event can involve the arm of the user. In some examples, the grip event can be characterized by the user contacting the touch sensitive surface with the flat portion of the user's hand (e.g., a palm, the flat portion of a user's thumb or finger as opposed to the user's fingertip). In some examples, the grip event is detected by the touch nodes, but was not intended by the user as a touch input. For example, a user can be holding (e.g., gripping) the electronic device while walking. In such examples, the user's grip on the device while walking is an unintentional input. In other examples, a user can be interacting with the electronic device with one hand (e.g., performing intended touch inputs) while holding (e.g., gripping) the device with the other hand (e.g., performing unintended touch inputs). In such examples, the user's grip on the device with the other hand is an unintentional input while the user's interaction with the electronic device with the first hand is an intentional input. In some examples, grip events can be identified based on the characteristics of the touch input, as will be described in further detail below. For example, a grip is often at or near the edge of the device, the input often has a large aspect ratio (e.g., narrow and long such as a finger or thumb), and/or covers a relatively large area (e.g., as compared to the tip of a finger or stylus). These and other unintended touches on the touch sensitive surface or touch screen, if not properly handled, can cause registering of unintended touch inputs and/or masking or misinterpreting intended touch inputs.

Figure 4A:
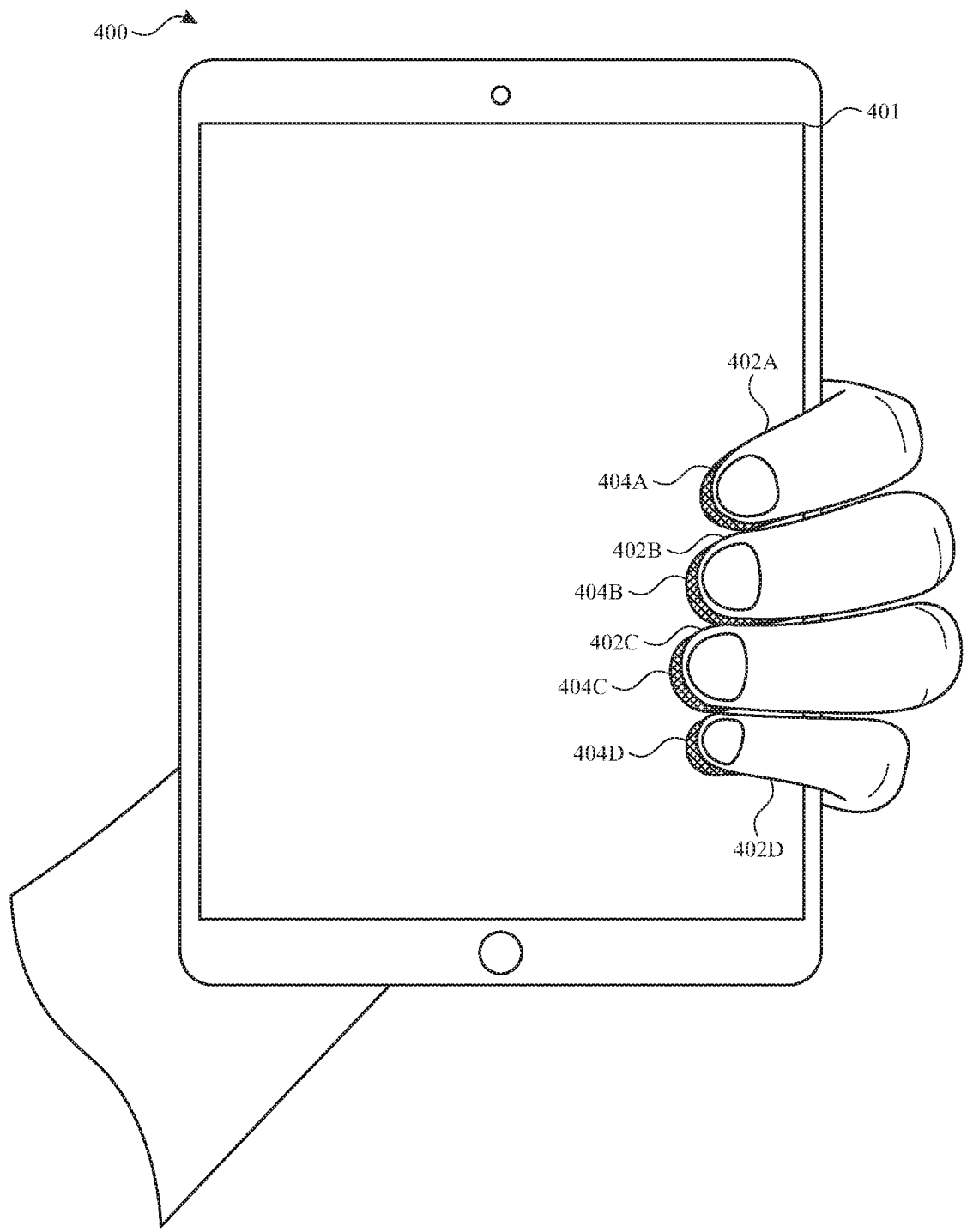
FIGS. 4A-4C illustrate examples of a user gripping an electronic device according to examples of the disclosure.
Figure 4B:
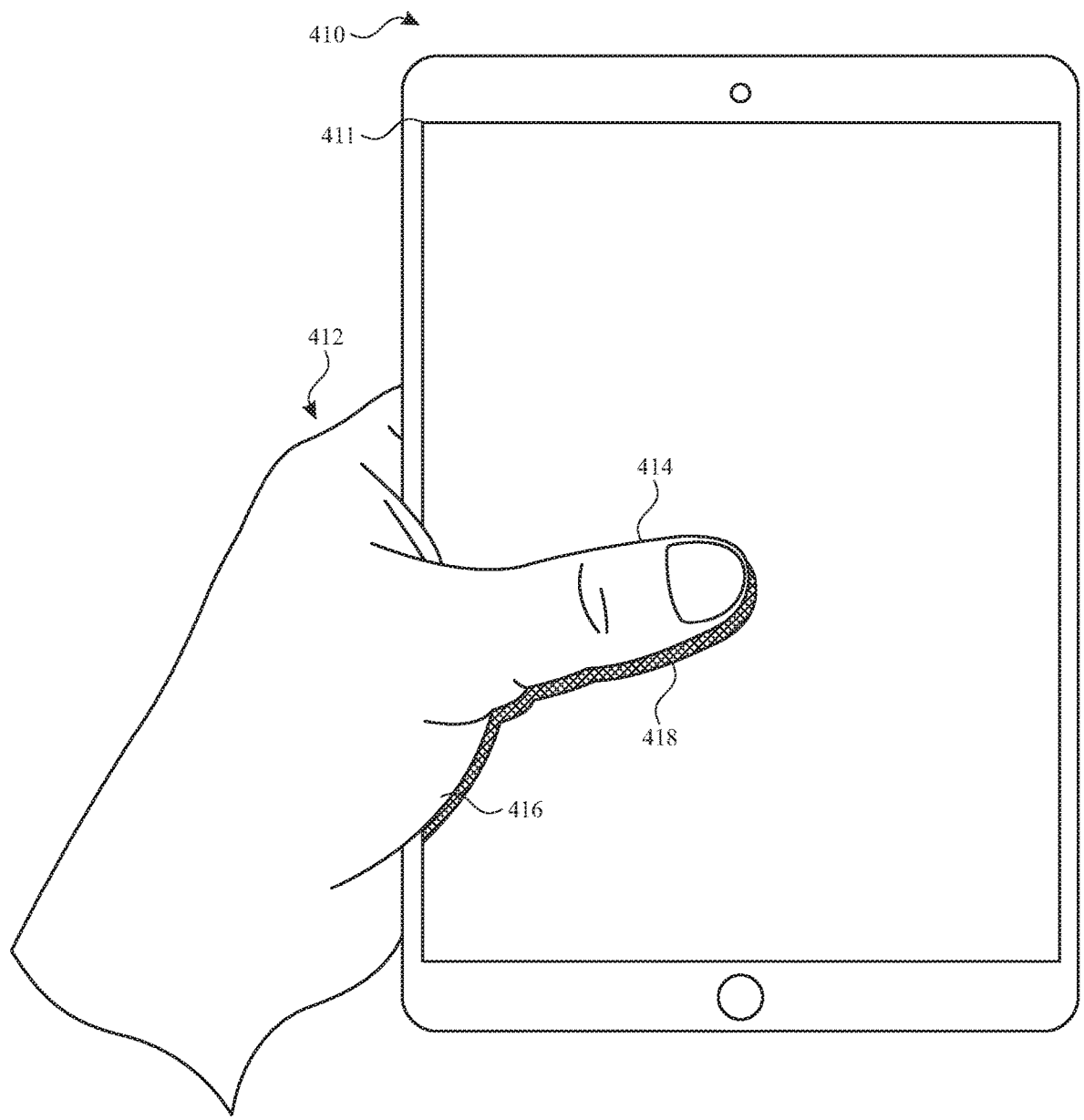
Figure 4C:
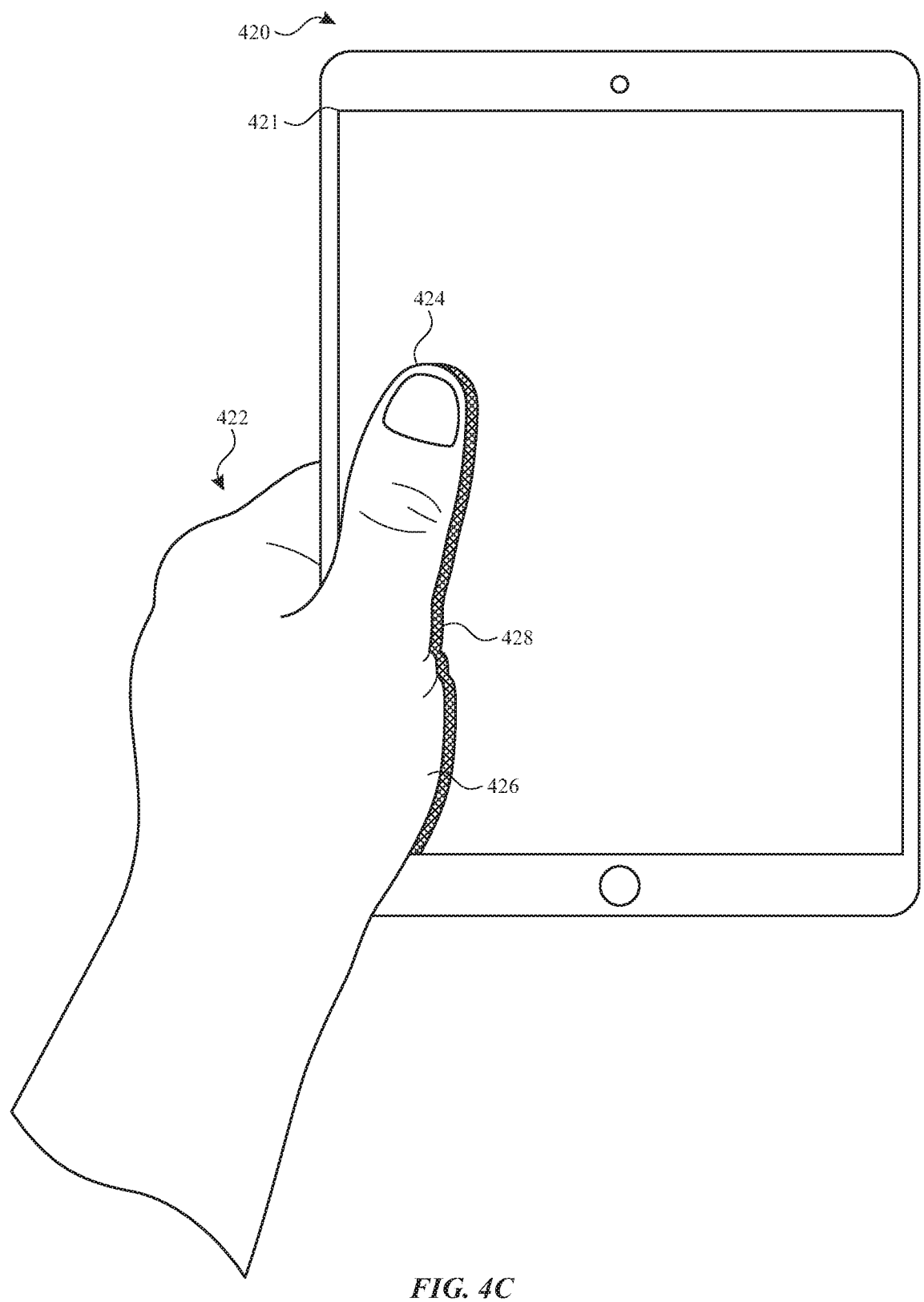

FIGS. 4A-4C illustrate examples of a user gripping an electronic device according to examples of the disclosure. FIG. 4A illustrates an electronic device 400 including a touch screen 401 (e.g., corresponding to mobile telephone 136 in FIG. 1A, media player 140 in FIG. 1B, personal computer 144 in FIG. 1C, tablet computer 148 in FIG. 1D, or any other electronic device with a touch sensitive surface or touch screen). A user can hold the electronic device 400 with a hand such that one or more fingers 402 of the gripping hand may come into proximity or contact with touch screen 401 and unintentionally generate touch input. For example, fingers 402*a-d* may cause the appearance of touch signals meeting (greater than or equal to) a touch signal threshold to be detected and be interpreted as input patches 404*a-d* (similar to input patch 308 described above with respect to FIG. 3) in the touch image. Without proper handling by the touch detection algorithm, these unintended touches could be falsely detected as touch input and trigger unintended behavior by the device (thereby harming the user experience).

FIG. 4B illustrates an electronic device 410 including a touch screen 411 (e.g., corresponding to mobile telephone 136 in FIG. 1A, media player 140 in FIG. 1B, personal computer 144 in FIG. 1C, tablet computer 148 in FIG. 1D, or any other electronic device with a touch sensitive surface or touch screen). A user can grip the electronic device 410 with a hand 412 (e.g., such as while walking while holding the device). As a result of thumb 414 and palm 416 coming into proximity or contact with touch screen 411, touch inputs can be unintentionally generated. For example, palm 416 and thumb 414 can be interpreted as input patch 418 (similar to input patch 308 described above with respect to FIG. 3) in the touch image. Without proper handling by the touch detection algorithm, this unintended touch by palm 416 and thumb 414 could be falsely detected as touch input and trigger unintended behavior by the device (thereby harming the user experience).

FIG. 4C illustrates an electronic device 420 including a touch screen 421 (e.g., corresponding to mobile telephone 136 in FIG. 1A). A user can grip the electronic device 420 with a hand 422 (e.g., such as while walking while holding the device or holding the device while interacting with the device with the other hand). As a result of thumb 424 and palm 426 coming into proximity or contact with touch screen 421, touch inputs can be unintentionally generated. For example, palm 426 and thumb 424 can be interpreted as input patch 428 (similar to input patch 308 described above with respect to FIG. 3) in the touch image. Without proper handling by the touch detection algorithm, this unintended touch by palm 426 and thumb 424 could be falsely detected as touch input and trigger unintended behavior by the device (thereby harming the user experience).

It is understood that although the above examples describe a user holding or gripping the device with a hand, the techniques described herein can be applied to other unintentional user input and is not limited to a hand nor a grip event.

Figure 5:
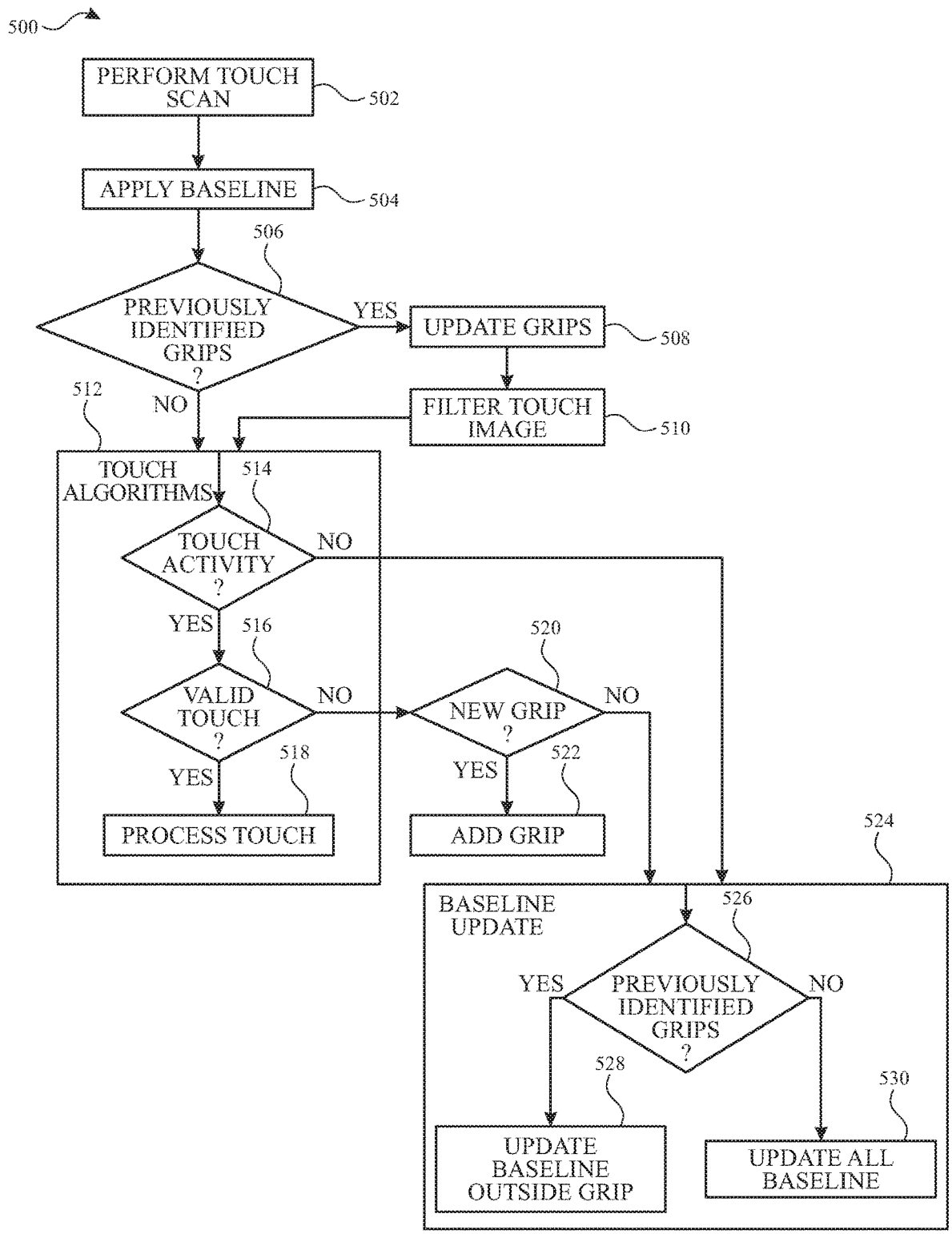
FIG. 5 illustrates an exemplary process of processing a touch scan according to examples of the disclosure.

FIG. 5 illustrates an exemplary process 500 of processing a touch scan according to examples of the disclosure. In some examples, process 500 can be performed by a touch processor (e.g., such as touch processor 202) or any other suitable processor, or a combination of multiple processors. At 502, a touch scan is performed. A touch scan can include performing one or more touch sensing steps in a scan frame to generate an image of touch on the touch-sensitive surface (e.g., touch screen). As described above, a touch scan can be performed using mutual capacitance techniques, self-capacitance techniques, a combination of mutual capacitance and self-capacitance, or any other technique for scanning a touch-sensitive surface for potential touch activity. In some examples, the touch scan provides a touch image (e.g., which can represent a snapshot) of touch node measurements for all or some of the touch nodes (e.g., touch electrodes) in the touch sensitive surface of the electronic device. In some examples, the touch image comprises a grid (e.g., two dimensional array, such as a matrix) of numerical values representing the touch signal (e.g., capacitance value) measured at each scanned touch node on the touch sensitive device.

In some examples, after performing a touch scan and acquiring a touch image, at 504, a baseline is applied to the touch image. In some examples, applying a baseline can include filtering the touch image using baseline touch data. In some examples, applying the baseline includes subtracting the baseline touch data (e.g., a baseline image) from the acquired touch image. In some examples, the baseline touch data is a touch image that was previously acquired while the system determined that there was no touch activity. Thus, in some examples, the baseline touch data comprises the touch node measurements for the touch nodes in the touch sensitive surface that represent the state of the touch nodes during a steady state (e.g., when there is no touch activity). In some examples, the baseline touch data is a representing as a grid (e.g., two dimensional array, such as a matrix) of numerical values representing the baseline touch signal (e.g., capacitance value) at each scanned touch node. In some examples, applying the baseline to the acquired touch image filters out background noise as a result of environmental factors, stray capacitances, parasitic capacitances, etc. (e.g., when these effects are embodied in the captured baseline image). In some examples, touch measurements in the resulting touch image that remain after the touch image is baselined (e.g., positive values) can represent intentional and/or unintentional touches and/or changes in environmental factors that may have occurred after the baseline was previously captured (e.g., since the last baseline image update).

At 506, the touch processor determines whether any previously identified grips exist in a grip database (e.g., stored in memory, such as RAM 212 or other peripherals 204). In some examples, the grip database indicates whether one or more grips have been identified in previous scan frames within a threshold period of time (e.g., previous 5 touch scans, 10 touch scans, 20 touch scans, previous 5 seconds, 30 seconds, 2 minutes, etc.). In some examples, the grip database includes all currently active grips (e.g., grips identified as still contacting the touch-sensitive surface) as of the most recent touch scan or as of the most recent grip identification process (e.g., such as process 600 described below with respect to FIG. 6). In some examples, the grip database includes touch measurement information corresponding to the previously identified grips, such as the shape, size, and/or strength of the respective grip, and/or which touch nodes are affected by the respective grip (e.g., the touch measurements of the touch nodes that are affected by the respective grip). In some examples, the grip database can track grips as paths (in a similar manner as described with reference to FIG. 3), tracking various parameters of the grip without processing these grip paths as touch input. The grip paths can be tracked as such from the initial identification as a grip (at or shortly after touchdown) until liftoff of the grip. In some examples, if the grip database indicates that previously identified grips exist, process 500 continues at 508 to update the grips in grip database. In some examples, if the grip database indicates that there are no previously identified grips, then process 500 proceeds to process the touch image at 512.

In some examples, at 508, in accordance with a determination that the grip database indicates that there are previously identified grips (e.g., active grips), the previously identified grips are updated. In some examples, the touch processor determines, for each grip, whether the respective grip has moved, increased or decreased in intensity, or otherwise changed shape or size. In some examples, updating a previously identified grip includes determining whether the grip no longer exists (e.g., whether the grip has been removed from the touch sensitive surface or otherwise no longer satisfies the grip criteria). In some examples, updating previously identified grips includes performing a grip identification process, such as process 600, which is described in further detail below with respect to FIG. 6 (or a subset of process 600). In some examples, any determined changes or updates to previously identified grips are saved to the grips database such that the entries for the respective previously identified grips are updated or replaced. Thus, in some examples, after updating grips at 508, the grips that are defined in the grips database represents all known currently active grips (e.g., the grips that are still in contact with the touch sensitive display during the current scan frame/touch image). In some examples, any previously identified grips that are determined to no longer be in contact with the touch sensitive surface (e.g., removed from the touch sensitive surface or otherwise no longer satisfies the grip criteria) are removed from the grip database.

In some examples, after previously identified grips are updated, at 510, the acquired touch image is filtered based on the previously identified grips in the grips database. In some examples, filtering the touch image based on the previously identified grips includes subtracting the touch data corresponding to each previously identified grip from the touch image such that the resulting touch image does not include any previously identified grips. In some examples, the active grips stored in the data base can be represented as a grip touch image (which can be updated at 508), and subtracting the previously identified grips includes subtracting the grip touch image from the touch image output after applying the baseline at 504. In some examples, filtering the touch image includes zeroing the touch measurements of the touch nodes that correspond to the previously identified grips (e.g., setting the touch measurements of the respective touch nodes to zero). In some examples, after filtering the touch image for grips, process 500 continues to process the baseline and grip filtered touch image using touch processing algorithms.

At 512, the touch image is processed by the touch processor's touch algorithms. In some examples, the touch processor's touch algorithms include determining whether the touch image includes touch activity (514), determining whether the touch activity is a valid touch (516), and processing the touch activity (518). In some examples, determining whether the touch image includes touch activity at 514 includes determining, based on the touch image (baselined and optionally filtered based on previously identified grips), whether the touch image includes measurements or input patches representative of touch activity. For example, positive touch measurements remaining after baselining (e.g., at 504) and/or filtering based on previously identified grips (e.g., at 510) can be identified as touch activity. In some examples, positive touch measurements that are above a predetermined threshold can be identified as touch activity. In some examples, an input patch that is greater than a predetermined minimum size (e.g., 3 touch nodes, 4 touch nodes, 8 touch nodes, 10 touch nodes) can be identified as touch activity (e.g., a grouping of positive touch measurements). In some examples, other heuristics can be used to identify touch activity within the touch image.

In some examples, if touch activity is detected, then at 516, the touch processor determines whether the detected touch activity is a valid touch (e.g., valid touch input). In some examples, determining whether the touch activity is a valid touch includes determining whether the touch activity matches an expected touch pattern. For example, if the device is in a sleep state, then the touch processor can look for a specific input pattern for waking the device from the sleep state and at 516 can determine whether the detected touch activity matches this specific touch pattern. In some examples, other heuristics can be used to determine whether the touch is a valid touch. For example, a valid touch can have a certain minimum touch size, minimum touch intensity (e.g., the touch measurements are at least a threshold amount), minimum touch density (e.g., amount of positive touch measurements out of total measurements within an area), be at a certain location, and/or other possible requirements. In some examples, if the touch processor determines that the identified touch activity is a valid touch, then the touch algorithm processes the touch activity (518). In some examples, processing the touch includes characterizing the touch (or gesture) and causing the device to perform one or more functions based on the touch (or gesture). In some examples, at 514, the touch algorithm can segment the touch image into distinct touches (input patches). In some examples, each distinct touch can be processed at steps 516. For example, a touch image can include a new grip and an intentional touch input and step 516 can be performed once for the new grip (e.g., which can be identified as not a valid touch and proceed to step 520) and once for the intentional input (e.g., which can be identified as a valid touch and proceed to step 518). In some examples, the touch input can include any number of distinct intentional touch inputs and distinct grips, each of which can be processed separately or all of which can be processed together.

In some examples, a predetermined maximum number of distinct grips (e.g., 3 grips, 4 grips, 5 grips, etc.) can be accepted by the touch processor. In some examples, if the number of identified grips is equal to or exceeds the predetermined maximum number of distinct grips, all touch input patches can be ignored and not processed (e.g., forgo step 518). For example, if three grips have been identified, then when a fourth grip is identified (e.g., four fingers gripping the device), it is unlikely that the user will be intentionally interacting with the touch sensitive device. Thus, in such an example, the touch processor can forgo processing all touch input patches until the number of identified grips is equal to or less than the maximum amount of distinct grips (e.g., from four identified grips to three identified grips).

In some examples, if the touch algorithm determines that there is no touch activity at 514, then the touch processor can initiate a process to update the baseline touch data (524) for the touch sensitive surface. It is understood that the touch processor does not necessarily initiate the process to update baseline touch data for every scan frame where there is no identified touch activity. In some examples, the baseline touch data is updated only if the baseline has not been updated for a predetermined amount of time (e.g., 30 seconds, 1 minute, 5 minutes, etc.) or if the touch image diverges from the baseline touch data by a threshold amount (e.g., 5% difference, 10% difference, 20% difference). In some examples, the process to update the baseline touch data can include determining whether any previously identified grips exist in the grip database (526), similar to the operation at 506 described above, the details of which will not be repeated here for brevity. In some examples, if there are no previously identified grips, then the touch processor updates all of the baseline touch data (530) for the touch-sensitive surface. In some examples, updating all of the baseline touch data includes storing a snapshot of the touch node measurements of every touch node (e.g., touch electrode) in the touch sensitive surface of the electronic device (e.g., updating the entire baseline touch image). In some examples, updating the baseline touch data includes overwriting the previous baseline touch data with the updated data. In some examples, the snapshot of the touch node measurements is the touch image acquired during the touch scan at 502 (e.g., the raw touch data before baselining). In some examples, a new snapshot is taken from a new touch scan (e.g., specific for updating baseline touch data), different from the scan performed at step 502. In some examples, updating all the baseline touch data at 530 includes updating the touch data for the entire touch-sensitive surface or a portion of the touch-sensitive surface. In some examples, step 530 is performed without regard to the existence of or location of any grips (e.g., because there are no previously identified grips).

In some examples, if there are previously identified grips in the grips database, then at 528, the touch processor updates the baseline touch data for the touch nodes that are not associated with any of the previously identified grips. In other words, the touch processor updates the baseline touch data for any or all portions of the touch sensitive surface that are not affected by (e.g., associated with, corresponding to, contacted by) any of the previously identified grips. For example, if a grip is identified in a bottom-left corner of the touch-sensitive surface (e.g., such as in FIG. 4C), then updating the baseline touch data includes updating the baseline touch data for all areas of the touch-sensitive surface except for the bottom-left corner. In some examples, the baseline touch data for the bottom-left corner is not updated and is maintained at the same value as the previous baseline touch data. In some examples, the baseline touch data for the bottom-left corner is reset to a default baseline value. In some examples, only the touch nodes that are affected by the previously identified grips are not updated. In some examples, the non-updated area includes a buffer around the touch nodes affected by the previously identified grips (e.g., 1 mm, 3 mm, 5 mm, 1 touch electrode, 5 touch electrodes, 10 touch electrodes, etc.). In some examples, a bounding box around each of the previously identified grips (e.g., similar to the bounding boxes described below with respect to FIGS. 8A-8C) can be used to delineate the non-updated area (e.g., the area inside the bounding box is not updated).

In some examples, if there are multiple previously identified grips, then the touch processor forgoes updating the baseline data of the touch nodes affected by each of the previously identified grips. In some examples, updating the baseline touch data for the areas that are not affected by the previously identified grips shares a similar process as described above with respect to operation at 530 and will not be repeated here for brevity.

In some examples, if the touch algorithm determines that the identified touch activity is not a valid touch at 516, then at 520, the touch processor determines whether the identified touch activity is a new grip. In some examples, the determination of whether the identified touch activity is a new grip includes determining whether the identified touch activity satisfies one or more grip identification criteria, similar to process 600 as will be described in further detail below with respect to FIG. 6. In some examples, if the identified touch activity does not satisfy the one or more grip identification criteria, then the touch activity is determined to not be a grip and the touch identified touch activity may be a result of natural drift in the touch measurements (e.g., as a result of changes in the environment or other factors). Thus, in some examples, the touch processor forces a baseline update and process 500 proceeds to initiate a process to update the baseline touch data, at 524, as discussed above. In some examples, if the identified touch activity satisfies the one or more grip identification criteria, then the touch activity is identified as a grip and at 522, the identified grip is added to the grip database (e.g., a new entry is created). In some examples, if the touch activity includes one or more other grips and/or one or more valid touches, process 500 can repeat step 520 and 522 (e.g., for the other grips) and/or proceed to step 518 (e.g., for the valid touches).

It is understood that touch activity can correspond to one or more new grips and one or more new touches. In some examples, detecting one or more touches without grips at 516 can result in processing each of the touch inputs at 518. In some examples, detecting one or more new touches concurrently with one or more new grips can result in the touch processor identifying new grips at 520 and processing inputs at 518. In such examples, the one or more new grips can be segmented from the one or more new touches and processed separately. In some examples, the one or more new grips can be determined as not valid touches at 516 and then identified as new grips at 520. In some examples, each new grip is segmented and evaluated individually at 520. In some examples, all of the grips are evaluated together at 520 and can be identified as a single grip or as separate grips (e.g., similarly to described below with respect to FIG. 8A). In some examples, the one or more new touches can be identified as valid touches at 516 and processed at 518. In some examples, the new grips are not segmented from the new touches and the touch processor determines that there are both valid touches and invalid touches in the touch image. In such examples, the touch processor identifies the grips at 520, adds the new grips into the grip database at 522 and then processes the valid touches (e.g., the new touches) at process 518.

It is understood that process 500 is one example, but that variations can be made without departing from the scope of the disclosure. In some examples, determining whether the identified touch activity is not a valid touch at 516 is optional and not performed. In such examples, if touch activity is detected at 514, then the touch processor determines whether the touch activity is a new grip at 520. In some examples, if the touch activity is identified as a grip at 520, then the identified grip is added to the grip database at 522. In some examples, if the touch activity does not satisfy the one or more grip criteria, then the touch activity is not identified as a grip and the touch processor processes the touch activity at 518 (e.g., instead of updating the baseline at 524).

It is understood that after process 500 is completed, the touch processor can repeat process 500 to perform the next touch scan (e.g., another scan frame).

Figure 6:
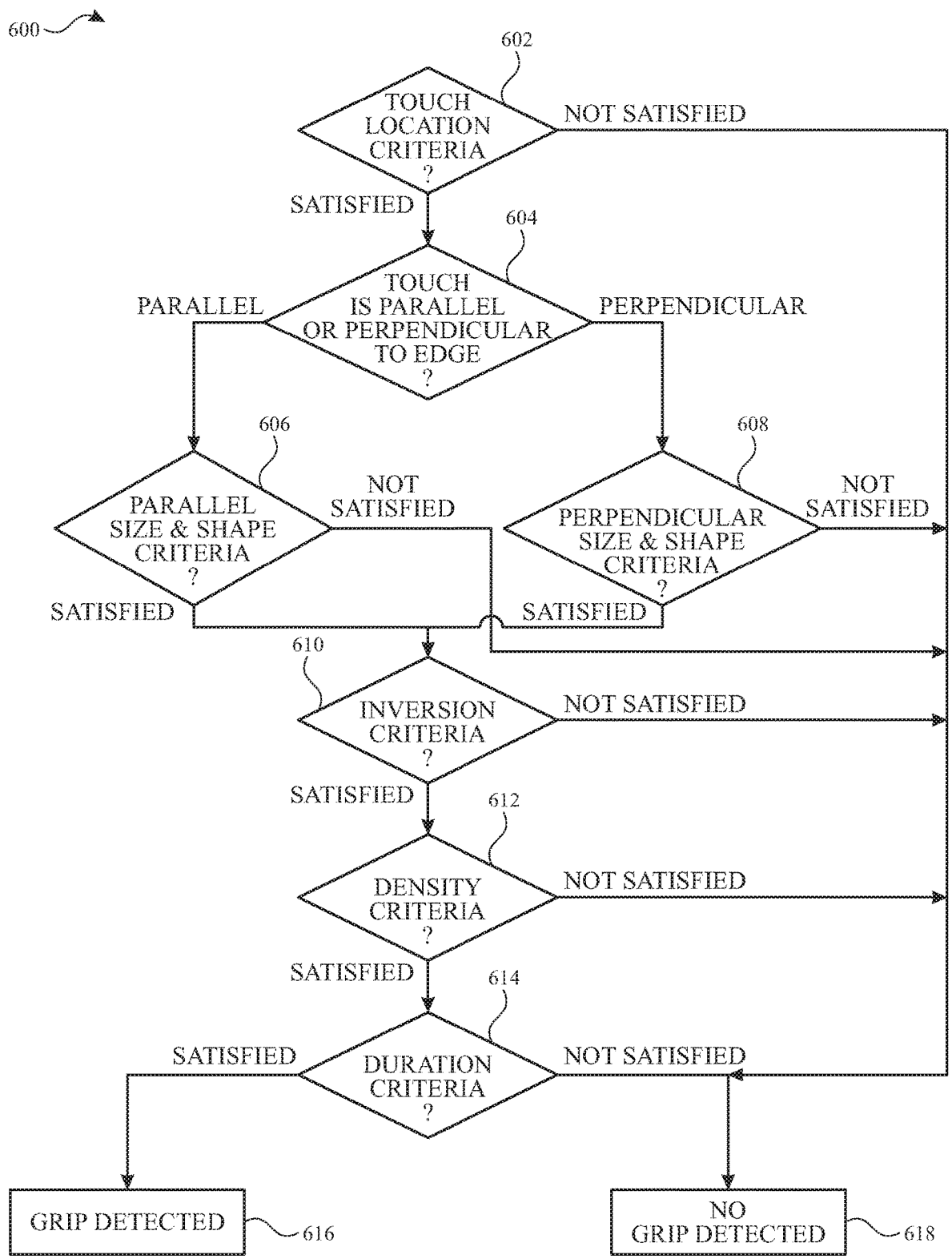
FIG. 6 illustrates an exemplary process of identifying a grip according to examples of the disclosure.

FIG. 6 illustrates an exemplary process 600 of identifying a grip according to examples of the disclosure. In some examples, process 600 illustrates an exemplary grip detection algorithm for detecting and/or identifying a grip in a touch image. In some examples, process 600 can be performed by a touch processor (e.g., such as touch processor 202) or any other suitable processor, or a combination of multiple processors. As shown in FIG. 6, identifying a grip includes determining whether a respective input patch satisfies one or more grip identification criteria. In some examples, the respective input patch is identified in a touch image, such as the one acquired at step 502 described above with respect to FIG. 5. In some examples, as described above with respect to FIG. 5, if the input patch corresponds to multiple potential grips, the respective input patch can be segmented into a plurality of potential grips (e.g., to be evaluated individually as separate grips) or as one potential grip (e.g., to be evaluated as one grip). In some examples, if any of the grip identification criteria are not satisfied, the input patch is not identified as a grip. In some examples, not every criterion shown and described in FIG. 6 is required for the input patch to be identified as a grip and some subset of criteria can be used. It is understood that the grip identification criteria need not be evaluated in the order shown in FIG. 6. In some examples, as will be described below, the grip identification criteria can include any of touch location criteria, size and shape criteria, inversion criteria, density criteria, and duration criteria that are described in more detail below. As discussed above, process 600 can be used to identify new grips (e.g., at 520) or update previously identified grips (e.g., at 508).

At 602, the touch processor determines whether the input patch satisfies the touch location criteria. In some examples, if the input patch is detected within a certain distance from an edge of the touch-sensitive surface and/or within a certain distance from an edge of the device, then the input patch is potentially a grip. In some examples, this is determined by determining how far the input patch is from the closest edge of the touch-sensitive surface (or edge of the device). In some examples, this is measured from the closest edge of the touch sensitive surface (or edge of the device) to the point of the input patch (e.g., input patch) that is closest to the closest edge. In some examples, this is measured from the centroid of the input patch to the closest edge of the touch sensitive surface or device. Thus, in some examples, the touch location criteria requires that the input patch be within a maximum distance from the edge of the touch sensitive surface. In some examples, the maximum distance is a predetermined maximum distance (e.g., 5 mm, 10 mm, 20 mm, 50 mm, 10 touch electrodes, 20 touch electrodes, 50 touch electrodes, 200 touch electrodes, etc.). In some examples, if the input patch is more than the predetermined maximum distance from the touch sensitive surface, it is unlikely that the user is gripping the device and more likely that the input patch is a result of the user intentionally interacting with the device or a baseline shift (e.g., change in environmental factors causing a change in the measured capacitance). In such examples, if the touch location criteria is not satisfied, process 600 proceeds to step 618 and the input patch is not identified as a grip and not added to the grip database. In some examples, if the input patch is less than the predetermined maximum distance, then the touch location criteria is satisfied and process 600 proceeds to test one or more other grip identification criteria.

At 604, the touch processor determines whether the input patch is parallel or perpendicular to the nearest edge of the touch sensitive surface. For example, grips shown in FIGS. 4A and 4C can be viewed as parallel to the right edge and left edge, respectively, and the grip shown in FIG. 4B can be viewed as perpendicular to the left edge. In some examples, a long axis (e.g., length) and/or a short axis (e.g., width) of the input patch is determined by analyzing the size and shape of the input patch. In some examples, the orientation of the input patch is determined by comparing the long axis of the input patch against the short axis. In some examples, if the longer dimension of the input patch (e.g., the long axis, the length, etc.) is parallel or substantially parallel (e.g., in a direction that is within 10 degrees, 20 degrees, 30 degrees of parallel) to the nearest edge of the touch sensitive surface and/or the shorter dimension of the input patch (e.g., the short axis, the width, etc.) is perpendicular or substantially perpendicular (e.g., in a direction that is within 10 degrees, 20 degrees, 30 degrees of perpendicular) to the nearest edge of the touch sensitive surface, then the input patch is determined to be parallel to the nearest edge of the touch sensitive surface. In some examples, if the longer dimension of the input patch (e.g., the long axis, the length, etc.) is perpendicular or substantially perpendicular (e.g., in a direction that is within 10 degrees, 20 degrees, 30 degrees of perpendicular) to the nearest edge of the touch sensitive surface and/or the shorter dimension of the input patch (e.g., the short axis, the width, etc.) is parallel or substantially parallel (e.g., in a direction that is within 10 degrees, 20 degrees, 30 degrees of parallel) to the nearest edge of the touch sensitive surface, then the input patch is determined to be perpendicular to the nearest edge of the touch sensitive surface. In some examples, other methods of determining whether the input patch is parallel or perpendicular to the nearest edge of the touch sensitive surface are possible. As discussed below, based on the characterization of the input patch, different size and shape requirements are applied to the input patch to determine whether the input patch is consistent with a user gripping the device.

If the input patch is parallel to the nearest edge, then at 606, the touch processor determines whether the input patch satisfies the parallel version of the size and shape criteria. In some examples, if the input patch has a width (e.g., the dimension that is perpendicular to the edge) that is between a predetermined minimum width (e.g., 5 mm, 10 mm, 15 mm) and a predetermined maximum width (e.g., 10 mm, 20 mm, 30 mm, 50 mm) and/or a length (e.g., the dimension that is parallel to the edge) that is between a predetermined minimum length (e.g., 10 mm, 20 mm, 30 mm) and a predetermined maximum length (e.g., 30 mm, 50 mm, 100 mm, 200 mm), then the input patch is potentially a grip and the parallel version of the size and shape criteria are satisfied and process 600 proceeds to evaluate one or more other grip identification criteria. In some examples, if the input patch has a width that is less than the predetermined minimum width or above the predetermined maximum width and/or has a length that is less than the predetermined minimum length or above the predetermined maximum length, then the parallel version of the size and shape criteria is not satisfied and process 600 proceeds to step 618 and the input patch is not identified as a grip and not added to the grip database.

If the input patch is perpendicular to the nearest edge at 604, then at 608, the touch processor determines whether the input patch satisfies the perpendicular version of the size and shape criteria. In some examples, if the input patch has a width (e.g., the dimension that is parallel to the edge) that is between a predetermined minimum width (e.g., 5 mm, 10 mm, 15 mm) and a predetermined maximum width (e.g., 10 mm, 20 mm, 30 mm, 50 mm) and/or a length (e.g., in the dimension perpendicular to the edge) that is between a predetermined minimum length (e.g., 10 mm, 20 mm, 30 mm) and a predetermined maximum length (e.g., 30 mm, 50 mm, 100 mm, 200 mm), then the input patch is potentially a grip and the perpendicular version of the size and shape criteria are satisfied and process 600 proceeds to test one or more other grip identification criteria. In some examples, if the input patch has a width that is less than the predetermined minimum width or above the predetermined maximum width and/or has a length that is less than the predetermined minimum length or above the predetermined maximum length, then the perpendicular size and shape criteria is not satisfied and process 600 proceeds to step 618 and the input patch is not identified as a grip and not added to the grip database.

Thus, the touch processor can determine the orientation of the input patch at 604 and based on the orientation of the input patch, apply different size and shape criteria to determine whether the input patch is potentially a grip. In some examples, the process is not limited to only identifying parallel or perpendicular orientations and can accommodate any angular orientation (e.g., diagonals from the edge) and apply the proper version of the size and shape criteria. In some examples, if the input patch includes a thumb and a palm, the touch processor can distinguish the thumb from the palm and perform the respective size and shape test on only the thumb portion of the touch input. In some examples, the touch processor performs the size and shape test on the thumb and palm inputs together. In some examples, if the touch processor detects a palm, then the size and shape criteria can be adjusted to take into account the input patches due to the palm (e.g., the ranges can be narrowed, widened, or otherwise adjusted). For example, as will be described below with respect to FIGS. 8B-8C, a palm input patch can affect the overall size and shape of the input patch.

At 610, the touch processor determines whether the input patch satisfies the touch inversion criteria. In some examples, the touch inversion criteria determines whether the touch measurements (e.g., the touch measurements after baselining at step 504) have become inverted such that it is more likely that the environmental factors have changed significantly or the previously captured baseline was deficient and a new baseline should be captured. In some examples, if the environmental factors have changed or the currently applied baseline is determined to be deficient and a new baseline should be captured, then the identified input patch may not be accurate and the input patch should not be identified as a grip until a clean baseline is captured. In some examples, determining whether the touch measurements have become inverted comprises counting the number of positive and negative measurements in the relevant area of the touch-sensitive surface associated with the input patch and comparing the counts to see if the number of negative measurements exceed the number of positive measurements. In some examples, the relevant area that is tested is a rectangular, or other polygonal shape, encompassing the input patch (e.g., similar to the bounding boxes described below with respect to FIGS. 8A-8C). In some examples, the relevant area dynamically adjusts (e.g., for each touch frame, each second, each distinct input patch, etc.) to the shape of the input patch. In some examples, the relevant area is the entire touch-sensitive surface. In some examples, if the negative measurements outnumber the positive measurements, it is more likely that the currently applied baseline was captured when the capacitive measurements were larger than appropriate or the environmental factors have changed the amount of signal detected at the touch nodes. Thus, the currently applied baseline does not represent a clean capture of the steady state measurements of the touch nodes (e.g., when there are no input patches). In such examples, if there are more negative measurements (e.g., the sum or total number of touch pixels with negative measurements) than positive measurements (e.g., the sum or total number of touch pixels with positive measurements), then the inversion criteria is not satisfied (e.g., the touch measurements cannot necessarily be trusted) and process 600 proceeds to step 618 and the input patch is not identified as a grip and not added to the grip database. In some examples, if the inversion criteria is not satisfied, the touch processor can force a baseline update, similar to the process described in step 524 described above with respect to FIG. 5. In some examples, if the negative measurements do not outnumber the positive measurements, then the input patch is potentially a grip and the touch inversion criteria is satisfied and process 600 proceeds to test one or more other grip identification criteria. In some examples, other thresholds are possible. For example, if the positive measurements outnumber the negative measurements by a predetermined threshold amount (e.g., 10%, 25%, 50%, 100% more positive measurements than negative measurements, 5, 10, 50, 200 more positive touch nodes than negative touch nodes), then the touch inversion criteria is satisfied and process 600 proceeds to test one or more other grip identification criteria. In some examples, if the positive measurements are less than the negative measurements by a predetermined threshold amount (e.g., 10% less, 25% less, 50% less positive measurements than negative measurements, 5, 10, 50, 200 less positive touch nodes than negative touch nodes), then the touch inversion criteria is not satisfied. In some examples, the inversion criteria can fail based on the magnitude of the negative measurements. For example, if the touch sensitive surface comprises only 25% negative measurements, but those negative measurements are relatively large (e.g., 2×, 3×, 5× larger than the average magnitude of the positive measurements, than the largest magnitude positive measurement, etc.), then the inversion criteria can also fail. Thus, the magnitude of the negative measurements can be a factor in determining whether the inversion criteria is satisfied or not satisfied. In some examples, an average can be taken to determine whether the inversion criteria is satisfied. In other words, the touch processor can take an average (e.g., arithmetic or geometric) of every measurement of the touch sensitive surface and if the average is positive, then the inversion criteria is satisfied, and if the average is negative, then the inversion criteria is not satisfied.

At 612, the touch processor determines whether the input patch satisfies the density criteria. In some examples, the touch processor determines whether the number of touch nodes with positive touch measurements (e.g., the positive touch measurements after baselining which represent touch activity at the touch node) satisfies the density requirement. In some examples, the density is calculated by dividing the number of touch nodes with positive touch measurements in the relevant area with the total number of touch nodes in the relevant area. In some examples, the density used herein at 612 is different than the density described above with respect to FIG. 3. In some examples, if the touch density is greater than a predetermined minimum density (e.g., 25%, 33%, 50%, 66%, 75%), then the input patch is potentially a grip and process 600 proceeds to test one or more other grip identification criteria. In some examples, if the touch density is less than a predetermined minimum density, then it is likely that the touch activity is not a grip and the density criteria is not satisfied and process 600 proceeds to step 618 and the input patch is not identified as a grip and not added to the grip database. Thus, in some examples, the density criteria tests whether the input patch is larger than a certain minimum size.

At 614, the touch processor determines whether the input patch satisfies the duration criteria. In some examples, as described above, the touch processor can track a grip over a plurality of touch frames (and is updated if the grip changes). In some examples, if the input patch is a previously identified grip and the grip has been held for longer than a predetermined maximum duration threshold (e.g., 30 seconds, 2 minutes, 5 minutes, 10 minutes, etc.), then there is a possibility that the grip has been misidentified as a grip. For example, the device may have been placed into a pocket and is in contact with an object that appears like a grip or otherwise satisfies the one or more grip criteria. In some examples, if the previously identified grip has not yet reached the predetermined maximum duration threshold, then the duration criteria is satisfied process 600 proceeds to step 616. In some examples, if the previously identified grip has reached or exceeded the predetermined maximum duration threshold, then the duration criteria is not satisfied (e.g., no longer satisfied) and process 600 proceeds to step 618 and the input patch is not identified as a grip and not added to the grip database (e.g., or the respective previously identified grip is removed from the grip database).

In some examples, if the grip identification criteria described above are satisfied, then, at 616, the input patch is identified as a grip (e.g., an unintentional touch input) and added to the grip database. In some examples, if process 600 is performed to update a previously identified grip and the grip identification criteria are satisfied, then the respective entry in the grip database is updated to reflect any changes in the grip (e.g., overwritten with the data of the input patch). In some examples, if the grip identification criteria are not satisfied, then at 618, the input patch is not identified as a grip and not added to the grip database. In some examples, if process 600 is performed to update a previously identified grip and the grip identification criteria are no longer satisfied, then the respective entry in the grip database is deleted to reflect that the grip has been removed (or otherwise no longer satisfying the requirements to be identified as a grip).

Figure 7:
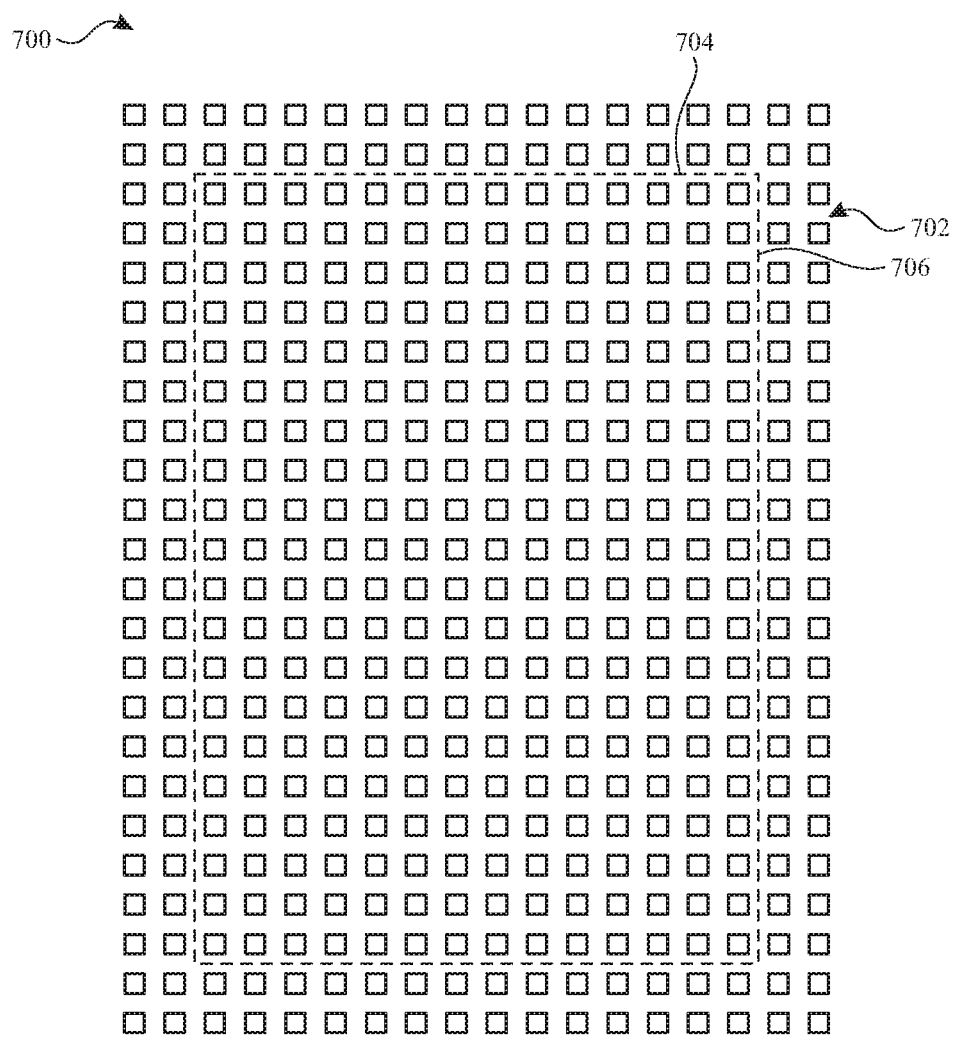
FIG. 7 illustrates an exemplary array of touch nodes of a touch sensitive surface according to examples of the disclosure.

FIG. 7 illustrates an exemplary array 700 of touch nodes of a touch sensitive surface according to examples of the disclosure. The touch nodes in array 700 can correspond to an array of plates of conductive material of a pixelated touch sensor panel (e.g., configured to measure self-capacitance). Although illustrated in this fashion in FIGS. 7-8, the touch nodes in array 700 can correspond to a row-column touch sensor panel measuring mutual capacitance at touch nodes formed at the intersections between drive lines and sense lines (e.g., each illustrated touch node represents an intersection between a drive line and a sense line). Array 700 can span the dimensions of the touch screens illustrated in the systems of FIGS. 1A-1D, for example.

In FIG. 7, boundary 706 represents the maximum distance of the touch location requirement described above at step 602. In some examples, boundary 706 separates array 707 into an edge region 702 and a non-edge region 704. In some examples, boundary 706 can be set such that the edge region can be any predetermined width (e.g., 2 touch nodes, 10 touch nodes, 20 touch nodes, 50 touch nodes, 200 touch nodes, 5 mm, 10 mm, 20 mm, 50 mm, etc.). For example, as shown in FIG. 7, boundary 706 can be set at a width of two touch nodes. As described above with respect to step 602, to satisfy the touch location criteria, at least a portion of the identified input patch must be detected in the edge region (e.g., outside of boundary 706). In some examples, to satisfy the touch location criteria, the centroid of the identified input patch must be detected in the edge region. In some examples, the input patch being partially in the non-edge region of the touch-sensitive surface does not disqualify the input patch from satisfying the touch location criteria. In other words, in some examples, as long as a portion of the input patch is detected in the edge region, the touch location requirement is satisfied. Thus, in some examples, boundary 706 between the edge region and the non-edge region represents the maximum distance that the input patch can be from an edge of the touch-sensitive surface to be identified as a grip.

Figure 8A:
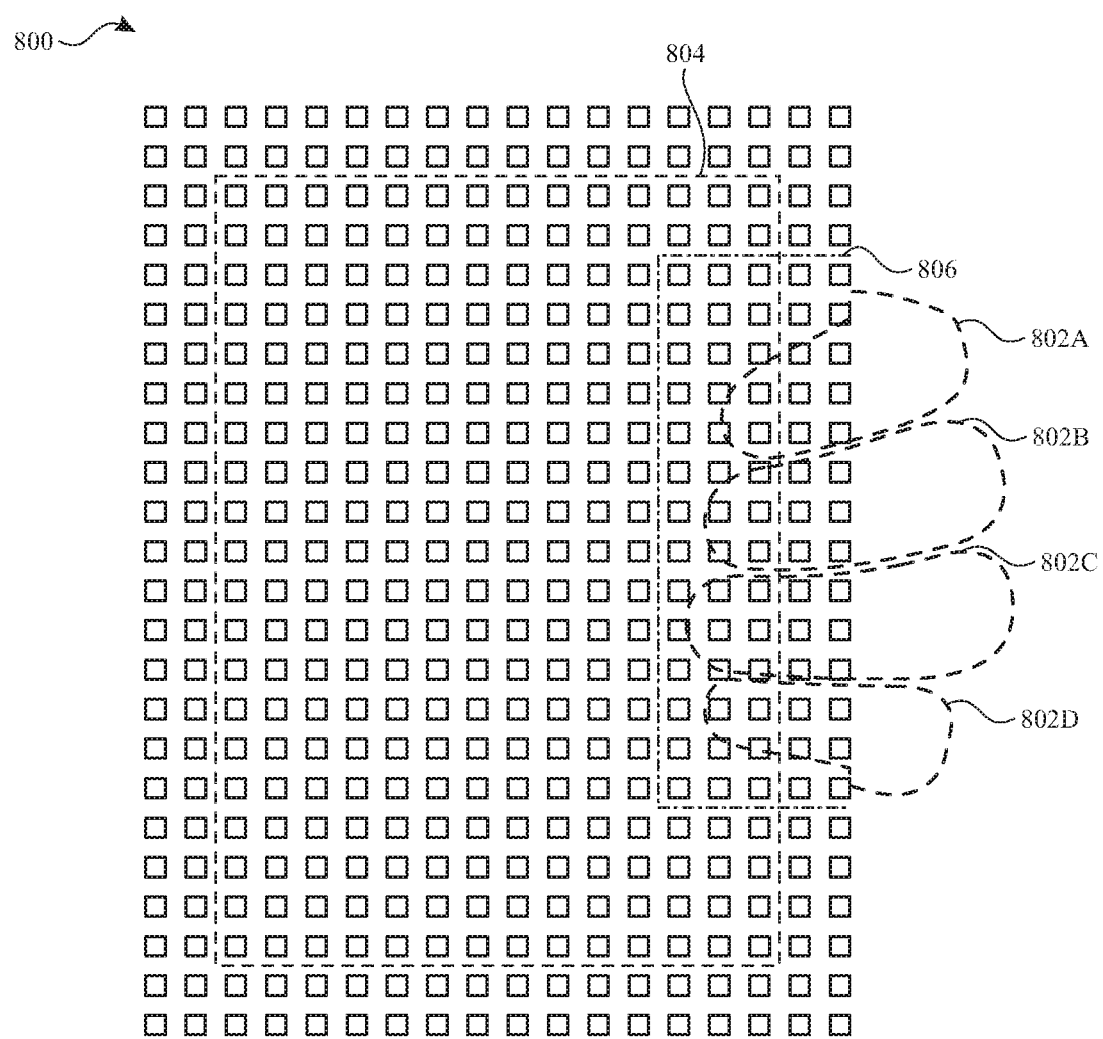
FIGS. 8A-8C illustrates exemplary arrays of touch nodes of a touch sensor panel according to examples of the disclosure.
Figure 8B:
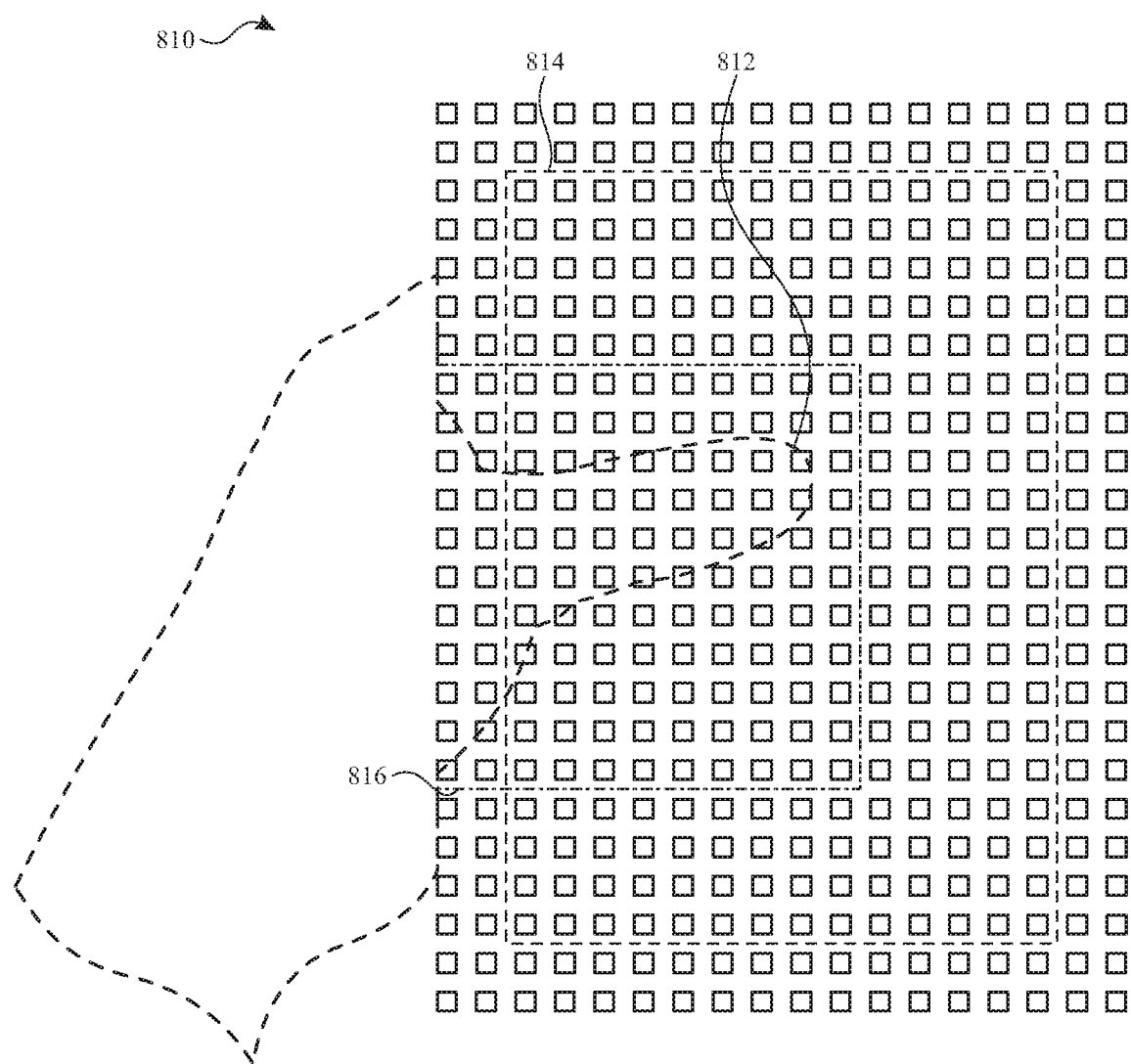
Figure 8C:
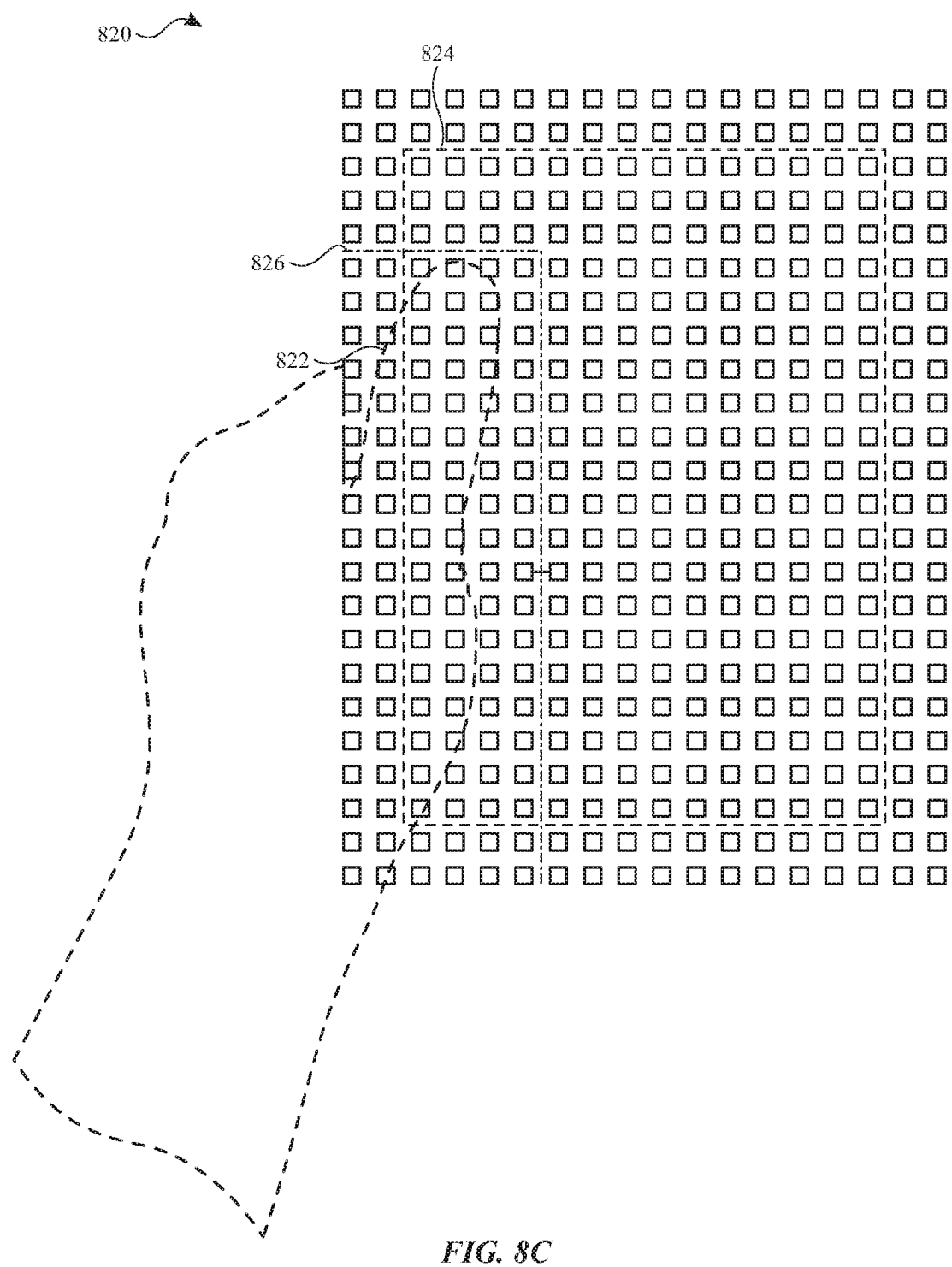

FIGS. 8A-8C illustrates exemplary arrays of touch nodes of a touch sensor panel according to examples of the disclosure. In some examples, FIGS. 8A-8C are touch node illustrations that correspond to the three grip examples illustrated in FIG. 4A-4C, respectively. FIG. 8A illustrates an exemplary array 800 of touch nodes including representations of four fingers (802*a-d*) gripping the device (e.g., corresponding to the grip illustrated in FIG. 4A). FIG. 8A further illustrates boundary 804 and bounding box 806. In some examples, boundary 804 represents the maximum distance of the touch location requirement (e.g., similar to boundary 706 described above with respect to FIG. 7). In some examples, bounding box 806 represents the relevant region used during the inversion criteria (e.g., step 610) and density criteria (e.g., step 612) evaluations. As shown in FIG. 8A, the four fingers are detected by a plurality of touch nodes on the right edge of the device (although it is understood that detection and identification of the grip can be on any edge and is not limited to only the right edge of the device).

In some examples, each of the four fingers (804) can identified as separate input patches and each finger can be individually identified as a distinct grip. For example, each of fingers 804*a*-804*d* can be identified as perpendicular to the edge (e.g., with a width of three touch nodes and a length of fourth touch nodes) and as satisfying the grip identification criteria.

In some examples, the four fingers (804) can be grouped together and identified as a single grip represented by bounding box 806. As shown in FIG. 8A, the four fingers 804 can satisfy the touch location criteria because at least a portion of the touch is outside of boundary 804 (e.g., within the maximum distance threshold from the right edge of the device). The fingers 804 can be identified as parallel to the edge with a width of four touch nodes and a length of eleven touch nodes. FIG. 8A illustrates bounding box 806 that represents the relevant area that is evaluated when determining whether the input patch satisfies the touch inversion criteria and/or the density criteria (e.g., steps 610 and 612 described above with respect to FIG. 6). For example, in some examples, when determining whether the input patch satisfies the touch inversion criteria and/or the density criteria, the touch processor creates a bounding box 806 around the input patch. In some examples, the bounding box 806 includes a margin around the input patch (e.g., 1 touch node, 2 touch nodes, 5 touch nodes, 10 touch nodes, etc.). Thus, in some examples, bounding box 806 is dynamically sized and positioned based on the boundaries of the input patch. As shown in FIG. 8A, bounding box 806 encompasses 70 total touch nodes, 38 of which are activated by fingers 802. Thus, in the example illustrated in FIG. 8A, the input patch has a density of 54%. In some examples, this density satisfies the density requirement and the input patch can be identified as a grip.

FIG. 8B illustrates an exemplary array 810 of touch nodes including thumb 812 gripping the device (e.g., corresponding to the grip illustrated in FIG. 4B). FIG. 8B further illustrates boundary 814 and bounding box 816. In some examples, boundary 814 represents the maximum distance of the touch location requirement (e.g., similar to boundary 706 described above with respect to FIG. 7). In some examples, bounding box 816 represents the relevant region used during the inversion criteria (e.g., step 610) and density criteria (e.g., step 612) tests. In some examples, the bounding box includes a margin around the input patch (e.g., 1 touch node, 2 touch nodes, 5 touch nodes, 10 touch nodes, etc.).

In some examples, a portion of the user's palm can also be in contact with the device. As shown in FIG. 8B, the thumb is detected by a plurality of touch nodes on the left edge of the device (although it is understood that detection and identification of the grip can be on any edge and is not limited to only the left edge of the device). As shown in FIG. 8B, thumb 814 satisfies the touch location criteria because at least a portion of the touch is within the maximum distance threshold from the left edge of the device (e.g., outside of boundary 814). In some examples, thumb 814 can be identified as perpendicular to the edge with a width of 9 touch nodes and a length of ten touch nodes. In some examples, if the touch processor recognizes a thumb and a palm, the touch processor can ignore the touch input made by the palm and evaluate only the thumb when determining the direction of the touch input and whether the touch input satisfies the respective size and shape criteria.

In some examples, the bounding box includes a margin around the input patch (e.g., 1 touch node, 2 touch nodes, 5 touch nodes, 10 touch nodes, etc.). As shown in FIG. 8B, bounding box 816 encompasses 121 total touch nodes, 41 of which are activated by thumb 812. Thus, in the example illustrated in FIG. 8B, the input patch has a density of 33%. In some examples, this density satisfies the density requirement and the input patch can be identified as a grip.

FIG. 8C illustrates an exemplary array 820 of touch nodes including thumb 822 gripping the device (e.g., corresponding to the grip illustrated in FIG. 4C). FIG. 8C further illustrates boundary 824 and bounding box 826. In some examples, boundary 824 represents the maximum distance of the touch location requirement (e.g., similar to boundary 706 described above with respect to FIG. 7). In some examples, bounding box 826 represents the relevant region used during the inversion criteria (e.g., step 610) and density criteria (e.g., step 612) tests. In some examples, the bounding box includes a margin around the input patch (e.g., 1 touch node, 2 touch nodes, 5 touch nodes, 10 touch nodes, etc.).

In some examples, a portion of the user's palm can also be in contact with the device. As shown in FIG. 8C, thumb 822 is detected by a plurality of touch nodes on the left edge of the device (although it is understood that detection and identification of the grip can be on any edge and is not limited to only the left edge of the device). As shown in FIG. 8C, thumb 822 satisfies the touch location criteria because at least a portion of the touch is within the maximum distance threshold from the left edge of the device (e.g., outside of boundary 824). In some examples, thumb 822 can be identified as parallel to the edge with a width of five touch nodes and a length of nineteen touch nodes. In some examples, if the touch processor recognizes a thumb and a palm, the touch processor can ignore the touch input made by the palm and evaluate only the thumb when determining the direction of the touch input and whether the touch input satisfies the respective size and shape criteria.

In some examples, bounding box 826 includes a margin around the input patch (e.g., 1 touch node, 2 touch nodes, 5 touch nodes, 10 touch nodes, etc.). As shown in FIG. 8B, bounding box 826 encompasses 114 total touch nodes, 62 of which are activated by thumb 822. Thus, in the example illustrated in FIG. 8C, the input patch has a density of 54%. In some examples, this density satisfies the density requirement and the input patch can be identified as a grip.

Therefore, according to the above, some examples of the disclosure are directed to a method. The method can comprise receiving a touch input patch from a touch-sensitive surface. Additionally or alternatively, in some examples, the method can comprise, in accordance with a determination, based on the touch input patch, that the touch input patch satisfies one or more grip criteria, identifying the touch input patch as a grip input. Additionally or alternatively, in some examples, in accordance with a determination that the touch input patch is parallel to an edge of the touch-sensitive surface, the one or more grip criteria includes a requirement that the touch input patch satisfies one or more parallel size and shape criteria. Additionally or alternatively, in some examples, in accordance with a determination that the touch input patch is perpendicular to the edge of the touch-sensitive surface, the one or more grip criteria includes a requirement that the touch input patch satisfies one or more perpendicular size and shape criteria. Additionally or alternatively, in some examples, the method can comprise, in accordance with a determination, based on the touch input patch, that the touch input patch does not satisfy the one or more grip criteria, forgoing identifying the touch input patch as a grip input.

Additionally or alternatively, in some examples, the one or more parallel size and shape criteria includes a requirement that the touch input patch has a width that is greater than a first predetermined minimum width and less than a first predetermined maximum width. Additionally or alternative, in some examples, the one or more parallel size and shape includes a requirement that the touch input patch has a length that is greater than a first predetermined minimum length and less than a first predetermined maximum length. Additionally or alternatively, in some examples, the one or more perpendicular size and shape criteria includes a requirement that the touch input patch has a width that is greater than a second predetermined minimum width and less than a second predetermined maximum width. Additionally or alternatively, in some examples, the one or more perpendicular size and shape criteria includes a requirement that the touch input patch has a length that is greater than a second predetermined minimum length and less than a second predetermined maximum length.

Additionally or alternatively, in some examples, the one or more parallel size and shape criteria are different from the one or more perpendicular size and shape criteria. Additionally or alternatively, in some examples, the one or more grip criteria further includes a requirement that the touch input patch is closer than a predetermined maximum distance from the edge of the touch-sensitive surface. Additionally or alternatively, in some examples, the one or more grip criteria further includes a criterion that is satisfied when a sum of negative touch node measurements in a portion of the touch-sensitive surface, including the touch input patch, is not greater than a sum of positive touch node measurements in the portion of the touch-sensitive surface. Additionally or alternatively, in some examples, the one or more grip criteria further includes a criterion that is satisfied when a density of touch nodes with positive touch node measurements in a portion of the touch-sensitive surface, including the touch input patch, is greater than a predetermined minimum density.

Additionally or alternatively, in some examples, the touch input patch corresponds to a previously identified grip. Additionally or alternatively, in some examples, the one or more grip criteria further includes a criterion that is satisfied when the touch input patch corresponding to the previously identified grip has been detected for less than a predetermined maximum duration. Additionally or alternatively, in some examples, the one or more grip criteria further includes one or more of a touch location criteria, an inversion criteria, a density criteria, and a duration criteria. Additionally or alternatively, in some examples, the touch input patch has been filtered based on baseline touch data. Additionally or alternatively, in some examples, the touch-sensitive surface is a touch-sensitive display.

Some examples of the disclosure are directed to an electronic device. The electronic device can include a touch-sensitive surface and one or more processors in communication with the touch-sensitive surface configured to perform any of the methods described above. Some examples of the disclosure are directed to a non-transitory computer readable storage medium. The non-transitory computer readable storage medium can store instructions, which when executed by one or more processors of an electronic device, cause the one or more processors to perform any of the methods described above.

Some examples of the disclosure are directed to a method. The method can comprise performing a first touch scan of a touch-sensitive surface, wherein performing the first touch scan includes receiving touch data from one or more first touch electrodes from a first portion of the touch-sensitive surface and one or more second touch electrodes from a second portion of the touch-sensitive surface. Additionally or alternatively, in some examples, the method can comprise, in accordance with a determination that one or more partial baseline update criteria are not satisfied, updating a baseline touch data of the first portion and the second portion of the touch-sensitive surface. Additionally or alternative, in some examples, the method can comprise, in accordance with a determination that one or more partial baseline update criteria are satisfied, updating the baseline touch data of the first portion of the touch-sensitive surface without updating the baseline touch data of the second portion of the touch-sensitive surface.

Additionally or alternatively, in some examples, updating the baseline touch data of the respective portion of the touch-sensitive surface includes storing the touch data of the respective portion of the touch-sensitive surface as the baseline touch data for the respective portion of the touch-sensitive surface. Additionally or alternatively, in some examples, updating the baseline touch data of the first portion of the touch-sensitive surface without updating the baseline touch data of the second portion of the touch-sensitive surface includes maintaining the baseline touch data of the second portion of the touch-sensitive surface. Additionally or alternatively, in some examples, the one or more partial baseline update criteria includes a criterion that is satisfied when one or more grips are in contact with the touch-sensitive surface. Additionally or alternatively, in some examples, the one or more partial baseline update criteria are satisfied, and the one or more grips are in contact with the second portion of the touch-sensitive surface.

Additionally or alternatively, in some examples, the method further comprises, after performing the first touch scan of the touch-sensitive surface, filtering the touch data based on baseline touch data. Additionally or alternatively, in some examples, the method further comprises, determining an existence of one or more previously identified grips. Additionally or alternatively, in some examples, the method further comprises, in accordance with a determination that one or more previously identified grips exist, updating the one or more previously identified grips. Additionally or alternatively, in some examples, the method further comprises, in accordance with a determination that the one or more previously identified grips do not exist, performing one or more touch algorithms on the touch data and forgoing updating the one or more previously identified grips.

Additionally or alternatively, in some examples, updating the one or more previously identified grips includes determining whether each of the one or more previously identified grips satisfies one or more grip criteria. Additionally or alternatively, in some examples, the method further comprises, after updating the one or more previously identified grips, filtering the touch data based on the one or more previously identified grips. Additionally or alternatively, in some examples, filtering the touch data based on the one or more previously identified grips includes zeroing respective data of the touch data associated with the one or more previously identified grips. Additionally or alternatively, in some examples, the method further comprises, after filtering the touch data based on the one or more previously identified grips, performing one or more touch algorithms on the filtered touch data.

Additionally or alternatively, in some examples, the one or more touch algorithms includes determining whether the touch data indicates first touch activity on the touch-sensitive surface, determining whether the first touch activity is a valid touch, and in accordance with a determination that the touch data indicates first touch activity and the first touch activity is valid touch, processing the first touch activity.

Additionally or alternatively, in some examples, the method further comprises, in accordance with a determination that the touch data does not indicate first touch activity on the touch-sensitive surface, initiating a process to update a baseline touch data of the touch-sensitive surface, including determining whether the one or more partial baseline update criteria are satisfied. Additionally or alternatively, in some examples, the method further comprises, in accordance with a determination that the first touch activity is not a valid touch, determining whether the first touch activity satisfies one or more grip criteria. Additionally or alternatively, in some examples, the method further comprises, in accordance with a determination that the first touch activity satisfies the one or more grip criteria, identifying the first touch activity as a grip. Additionally or alternatively, in some examples, the method further comprises, in accordance with a determination that the first touch activity does not satisfy the one or more grip criteria, forgoing identifying the first touch activity as a grip.

Additionally or alternatively, in some examples, the method further comprises, after identifying the first touch activity as a grip, performing a second touch scan of the touch-sensitive surface, wherein performing the second touch scan includes receiving second touch data from one or more third touch electrodes from a third portion of the touch-sensitive surface and one or more fourth touch electrodes from a fourth portion of the touch-sensitive surface, and wherein the fourth portion includes second touch activity corresponding to continued first touch activity. Additionally or alternatively, in some examples, the method further comprises, after identifying the first touch activity as a grip, filtering the second touch data to remove the second touch activity. Additionally or alternatively, in some examples, the method further comprises, after identifying the first touch activity as a grip, updating the baseline touch data of the third portion of the touch-sensitive surface without updating the baseline touch data of the fourth portion of the touch-sensitive surface.

Some examples of the disclosure are directed to an electronic device. The electronic device can include a touch-sensitive surface and one or more processors in communication with the touch-sensitive surface configured to perform any of the methods described above. Some examples of the disclosure are directed to a non-transitory computer readable storage medium. The non-transitory computer readable storage medium can store instructions, which when executed by one or more processors of an electronic device, cause the one or more processors to perform any of the methods described above.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. A method, comprising:
receiving a touch input patch from a touch-sensitive surface;

in accordance with a determination, based on the touch input patch, that the touch input patch satisfies one or more grip criteria, identifying the touch input patch as a grip input, wherein:
  in accordance with a determination that the touch input patch includes a palm and a thumb, the one or more grip criteria includes a requirement that the touch input patch satisfies a touch density criteria; and
in accordance with a determination, based on the touch input patch, that the touch input patch does not satisfy the one or more grip criteria, forgoing identifying the touch input patch as a grip input.

2. The method of claim 1, wherein:
in accordance with a determination that the touch input patch is parallel to an edge of the touch-sensitive surface, the one or more grip criteria includes a requirement that the touch input patch satisfies one or more parallel size and shape criteria;
wherein the one or more parallel size and shape criteria includes a requirement that the touch input patch has a width that is greater than a first predetermined minimum width and less than a first predetermined maximum width; and
wherein the one or more parallel size and shape includes a requirement that the touch input patch has a length that is greater than a first predetermined minimum length and less than a first predetermined maximum length.

3. The method of claim 1, wherein:
in accordance with a determination that the touch input patch is perpendicular to the edge of the touch-sensitive surface, the one or more grip criteria includes a requirement that the touch input patch satisfies one or more perpendicular size and shape criteria;
wherein the one or more perpendicular size and shape criteria includes a requirement that the touch input patch has a width that is greater than a second predetermined minimum width and less than a second predetermined maximum width; and
wherein the one or more perpendicular size and shape criteria includes a requirement that the touch input patch has a length that is greater than a second predetermined minimum length and less than a second predetermined maximum length.

4. The method of claim 1, wherein the one or more grip criteria further includes a criterion that is satisfied when a sum of negative touch node measurements in a portion of the touch-sensitive surface, including the touch input patch, is not greater than a sum of positive touch node measurements in the portion of the touch-sensitive surface.

5. The method of claim 1, wherein the touch density criteria is satisfied when a density of touch nodes with positive touch node measurements in a portion of the touch-sensitive surface, including the touch input patch, is greater than a predetermined minimum density.

6. The method of claim 1, wherein:
the touch input patch corresponds to a previously identified grip; and
the one or more grip criteria further includes a criterion that is satisfied when the touch input patch corresponding to the previously identified grip has been detected for less than a predetermined maximum duration.

7. The method of claim 1, wherein the one or more grip criteria further includes one or more of a touch location criteria, an inversion criteria, and a duration criteria.

8. The method of claim 1, wherein the touch input patch has been filtered based on baseline touch data.

9. The method of claim 1, wherein the touch-sensitive surface is a touch-sensitive display.

10. An electronic device comprising:
a touch-sensitive surface; and
one or more processors in communication with the touch-sensitive surface configured to perform a method comprising:
  receiving a touch input patch from the touch-sensitive surface;
  in accordance with a determination, based on the touch input patch, that the touch input patch satisfies one or more grip criteria, identifying the touch input patch as a grip input, wherein:
    in accordance with a determination that the touch input patch includes a palm and a thumb, the one or more grip criteria includes a requirement that the touch input patch satisfies a touch density criteria; and
  in accordance with a determination, based on the touch input patch, that the touch input patch does not satisfy the one or more grip criteria, forgoing identifying the touch input patch as a grip input.

11. A non-transitory computer readable storage medium storing instructions, which when executed by one or more processors of an electronic device, cause the one or more processors to perform a method comprising:
receiving a touch input patch from a touch-sensitive surface;
in accordance with a determination, based on the touch input patch, that the touch input patch satisfies one or more grip criteria, identifying the touch input patch as a grip input, wherein:
  in accordance with a determination that the touch input patch includes a palm and a thumb, the one or more grip criteria includes a requirement that the touch input patch satisfies a touch density criteria; and
in accordance with a determination, based on the touch input patch, that the touch input patch does not satisfy the one or more grip criteria, forgoing identifying the touch input patch as a grip input.

12. The non-transitory computer readable storage medium of claim 11, wherein:
in accordance with a determination that the touch input patch is parallel to an edge of the touch-sensitive surface, the one or more grip criteria includes a requirement that the touch input patch satisfies one or more parallel size and shape criteria;
wherein the one or more parallel size and shape criteria includes a requirement that the touch input patch has a width that is greater than a first predetermined minimum width and less than a first predetermined maximum width; and
wherein the one or more parallel size and shape includes a requirement that the touch input patch has a length that is greater than a first predetermined minimum length and less than a first predetermined maximum length.

13. The non-transitory computer readable storage medium of claim 11, wherein:
in accordance with a determination that the touch input patch is perpendicular to the edge of the touch-sensitive surface, the one or more grip criteria includes a requirement that the touch input patch satisfies one or more perpendicular size and shape criteria;
wherein the one or more perpendicular size and shape criteria includes a requirement that the touch input patch has a width that is greater than a second predetermined minimum width and less than a second predetermined maximum width; and wherein the one or more perpendicular size and shape criteria includes a requirement that the touch input patch has a length that is greater than a second predetermined minimum length and less than a second predetermined maximum length.

14. The anon-transitory computer readable storage medium of claim 11, wherein the one or more grip criteria further includes a criterion that is satisfied when a sum of negative touch node measurements in a portion of the touch-sensitive surface, including the touch input patch, is not greater than a sum of positive touch node measurements in the portion of the touch-sensitive surface.

15. The non-transitory computer readable storage medium of claim 11, wherein the touch density criteria is satisfied when a density of touch nodes with positive touch node measurements in a portion of the touch-sensitive surface, including the touch input patch, is greater than a predetermined minimum density.

16. The non-transitory computer readable storage medium of claim 11, wherein:

the touch input patch corresponds to a previously identified grip; and the one or more grip criteria further includes a criterion that is satisfied when the touch input patch corresponding to the previously identified grip has been detected for less than a predetermined maximum duration.

17. The non-transitory computer readable storage medium of claim 11, wherein the one or more grip criteria further includes one or more of a touch location criteria, an inversion criteria, and a duration criteria.

\* \* \* \* \*

UNITED STATES PATENT AND TRADEMARK OFFICE
CERTIFICATE OF CORRECTION

PATENT NO. : 11,256,367 B2
APPLICATION NO. : 16/866473
DATED : February 22, 2022
INVENTOR(S) : Mayank Garg et al.

Page 1 of 1

It is certified that error appears in the above-identified patent and that said Letters Patent is hereby corrected as shown below:

In the Claims

In Column 27, Line 8, in Claim 14, delete "anon-transitory" and insert --non-transitory--.

Signed and Sealed this
Third Day of May, 2022

Katherine Kelly Vidal
Director of the United States Patent and Trademark Office